US008937558B2

(12) United States Patent
Ozaki et al.

(10) Patent No.: US 8,937,558 B2
(45) Date of Patent: Jan. 20, 2015

(54) IMAGE GENERATING APPARATUS AND IMAGE DISPLAY SYSTEM

(75) Inventors: Yukisuke Ozaki, Kobe (JP); Yasuhiro Ohno, Kobe (JP); Takayoshi Yamashita, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 396 days.

(21) Appl. No.: 13/322,657

(22) PCT Filed: May 28, 2010

(86) PCT No.: PCT/JP2010/059077
§ 371 (c)(1),
(2), (4) Date: Nov. 28, 2011

(87) PCT Pub. No.: WO2010/137685
PCT Pub. Date: Dec. 2, 2010

(65) Prior Publication Data
US 2012/0068840 A1 Mar. 22, 2012

(30) Foreign Application Priority Data

May 29, 2009 (JP) ................................. 2009-130101

(51) Int. Cl.
*B60Q 1/48* (2006.01)
*G08G 1/16* (2006.01)
(Continued)

(52) U.S. Cl.
CPC .. *G08G 1/16* (2013.01); *B60R 1/00* (2013.01); *G09G 5/14* (2013.01); *B60R 2300/105* (2013.01); *B60R 2300/304* (2013.01);
(Continued)

(58) Field of Classification Search
USPC .............. 340/456, 932.2, 995.27, 425.5, 435, 340/436, 438, 461, 988; 382/104; 701/1, 701/36; 348/148
See application file for complete search history.

(56) References Cited

U.S. PATENT DOCUMENTS 7,039,504 B2 * 5/2006 Tanaka et al. ..................... 701/1
7,145,519 B2 * 12/2006 Takahashi et al. ................. 345/7
(Continued)

FOREIGN PATENT DOCUMENTS

JP       A-03-099952     4/1991
JP       A-2002-109697   4/2002
(Continued)

OTHER PUBLICATIONS

International Search Report in International Application No. PCT/JP2010/059077; dated Aug. 24, 2010 (with English-language translation).

*Primary Examiner* — Steven Lim
*Assistant Examiner* — Ryan Sherwin
(74) *Attorney, Agent, or Firm* — Oliff PLC

(57) ABSTRACT

A technology that does not require complicated operation to select a display mode is provided. In an image display system, a back mode stores a display mode that has been recently set as a current mode. When the display mode becomes the back mode next time, the display mode that has been recently set as a current mode is set as a current mode immediately after the display mode becomes the back mode. Accordingly, the driver does not need to perform the complicated operation to select a desired display mode each time the vehicle is reversed.

12 Claims, 28 Drawing Sheets

(51) Int. Cl.
*B60R 1/00* (2006.01)
*G09G 5/14* (2006.01)

(52) U.S. Cl.
CPC ..... *B60R2300/602* (2013.01); *B60R 2300/806* (2013.01); *B60R 2300/8093* (2013.01); *G09G 2340/12* (2013.01); *G09G 2380/10* (2013.01)
USPC ............... 340/932.2; 340/995.27; 340/425.5; 340/435; 340/436; 340/438; 340/461; 340/988; 382/104; 701/1; 701/36; 348/148

(56) References Cited

U.S. PATENT DOCUMENTS

| | | | | |
|---|---|---|---|---|
| 7,161,616 | B1* | 1/2007 | Okamoto et al. | 348/148 |
| 7,965,177 | B2* | 6/2011 | Kobayashi et al. | 340/461 |
| 8,218,007 | B2* | 7/2012 | Lee et al. | 348/148 |
| 8,339,253 | B2* | 12/2012 | Chundrlik et al. | 340/436 |
| 2005/0174429 | A1* | 8/2005 | Yanai | 348/148 |
| 2009/0010567 | A1* | 1/2009 | Akiba et al. | 382/298 |
| 2009/0171529 | A1* | 7/2009 | Hayatoma | 701/36 |
| 2010/0289631 | A1* | 11/2010 | Rao et al. | 340/435 |

FOREIGN PATENT DOCUMENTS

| | | |
|---|---|---|
| JP | A-2003-116125 | 4/2003 |
| JP | A-2003-281505 | 10/2003 |
| JP | A-2005-039547 | 2/2005 |
| JP | A-2005-050220 | 2/2005 |
| JP | A-2008-126794 | 6/2008 |
| JP | A-2009-049479 | 3/2009 |
| JP | A-2009-173286 | 8/2009 |
| JP | A-2009-248952 | 10/2009 |

* cited by examiner

IMAGE GENERATING APPARATUS AND IMAGE DISPLAY SYSTEM

TECHNICAL FIELD

The present invention relates to a technology for generating an image to be displayed on a display apparatus mounted on a vehicle.

RELATED ART

When a vehicle such as a car is reversed, a rear region of the vehicle may be a blind spot region that is not seen from a driver's seat. An image display system of a related art has a function of a back monitor, in which when a transmission of the vehicle is operated to be positioned in a reversing position, an image obtained from capturing by a vehicle mounting camera provided on a rear side of the vehicle is displayed on a display in the inside of the vehicle. By using the image display system, the driver can monitor the rear region of the vehicle, so that he/she can easily recognize an object that is likely to contact with the vehicle when the vehicle is reversed.

DISCLOSURE OF THE INVENTION

Technical Problems to be Solved by the Invention

In the back monitor, it has been suggested to display images showing the rear region of the vehicle in various aspects. For example, it has been suggested to display an image having a larger visual field in a horizontal direction than a general camera, or an image looking down the rear side of the vehicle from a position substantially directly above the vehicle.

Preferably, images in various aspects are used in accordance with circumstances that the vehicle is reversed. Accordingly, it is considered to prepare a plurality of display modes that display the respective images in various aspects, thereby enabling the driver to select one of the plurality of display modes when the back monitor is activated.

However, if the driver selects one of the display modes of the back monitor, he/she needs to select a desired display mode every time the vehicle is reversed. Under the circumstance that the complicated operation to reverse the vehicle is performed, performing the additional operation to select one of the display modes of the back monitor would make the operation complicated and may damage the convenience.

Accordingly, it is also considered to store a display mode that has been most recently set in the back monitor, and set the display mode immediately after the back monitor is activated next time. However, if an unusual display mode that is unnecessary at the time of starting parking operation (e.g., a display mode used for final adjustment of a parking position) or others is stored, the driver should perform operation to convert the display mode immediately after the back monitor is activated.

The present invention has been made in consideration of the circumstances, and its object is to provide technology that does not require complicated operation to select a display mode.

Means to Solve the Problems

The object of the present invention is accomplished by the configuration set forth below.

(1) An image generating apparatus that generates an image to be displayed on a display apparatus mounted on a vehicle, the image generating apparatus including: a mode receiving section that receives an instruction from a user, the instruction for selecting a display mode from among a plurality of display modes to make the display apparatus display an image showing the periphery of the vehicle during a transmission of the vehicle is shifted in a reverse gear, and for setting the selected display mode as a current mode, the display modes being different from each other; a non-volatile storing section that stores mode information indicating the current mode which has been most recently set; a generating section that generates the image of one of the display modes in accordance with the mode information stored in the storing section; and an output section that outputs the generated image to the display apparatus, wherein the generating section generates an image of the current mode when the mode information indicates a display mode other than a first specific display mode in the display modes as the current mode, and wherein the generating section generates an image of a second specific display mode different from the first specific display mode when the mode information indicates the first specific display mode as the current mode.

(2) The image generating apparatus set forth in (1) above further includes a controller including the storing section therein, wherein the controller reads the mode information stored in the storing section and controls the generating section to generate the image of the current mode when the mode information indicates the display mode other than the first specific display mode as the current mode, and wherein the controller reads the mode information stored in the storing section and controls the generating section to generate the image of the second specific display mode when the mode information indicates the first specific display mode as the current mode.

(3) In the image generating apparatus set forth in (1) or (2) above, the generating section starts generating the image of one of the display modes when the transmission of the vehicle is being shifted into the reverse gear.

(4) In the image generating apparatus set forth in any one of (1) to (3) above, the first specific display mode is used for final adjustment of a parking position of the vehicle.

(5) In the image generating apparatus as set forth in any one of (1) to (4) above, the first specific display mode is a display mode to make the display apparatus display an image being viewed from a virtual viewpoint substantially directly looking down a rear end of the vehicle.

(6) An image display system to be mounted on a vehicle, the image displaying system including: the image generating apparatus set forth in any one of (1) to (5); and a display apparatus that displays an image generated by the image generating apparatus.

(7) An image generating apparatus that generates an image to be displayed on a display apparatus mounted on a vehicle, the image generating apparatus including: a mode receiving section that receives an instruction from a user, the instruction for selecting a display mode from among a plurality of display modes to make the display apparatus display an image showing the periphery of the vehicle during a transmission of the vehicle is shifted in a reverse gear, and for setting the selected display mode as a current mode, the display modes being different from each other; a non-volatile storing section that stores mode information; a generating section that generates the image of one of the display modes in accordance with the mode information stored in the storing section; and an output section that outputs the generated image to the display apparatus, wherein the storing section stores the mode information indicating the current mode when the current mode which has been most recently set is a display mode other than a first specific display mode in the display modes, and wherein the storing section stores the mode information indicating a second specific display mode different from the first specific display mode when the current mode which has been most recently set is the first specific display mode.

(8) The image generating apparatus set forth in (7) above further includes a controller including the storing section therein, wherein the controller controls the storing section to store the mode information indicating the current mode when the current mode which has been most recently set is the display mode other than the first specific display mode, wherein the controller controls the storing section to store the mode information indicating the second specific display mode when the current mode which has been most recently set is the first specific display mode.

(9) In the image generating apparatus set forth in (7) or (8) above, the generating section starts generating the image of one of the display modes when the transmission of the vehicle is being shifted into the reverse gear.

(10) In the image generating apparatus set forth in any one of (7) to (9) above, the first specific display mode is used for final adjustment of a parking position of the vehicle.

(11) The image generating apparatus set forth in any one of (7) to (9) above, the first specific display mode is a display mode to make the display apparatus display an image being viewed from a virtual viewpoint substantially directly looking down a rear end of the vehicle.

(12) An image display system to be mounted on a vehicle, the image displaying system including: the image generating apparatus set forth in any one of (7) to (11) above; and a display apparatus that displays an image generated by the image generating apparatus.

Effect of the Invention

According to the image generating apparatus set forth in (1) to (5) and (7) to (11) above, and the image display system set forth in (6) or (12) above, a display mode of an image to be displayed on the display apparatus can be selected when the vehicle is reversed. In principle, a display mode that has been recently set as a current mode is set as a display mode of an image to be displayed on the display apparatus next time. Accordingly, if the user selects a display mode in accordance with his/her favorites or parking environments, the user does not need to perform the complicated operation to select a display mode every time he/she reverses the vehicle. Meanwhile, if a recent current mode is a first specific display mode, the current mode is not set as a display mode of an image to be displayed on the display apparatus next time. Accordingly, an image of the first specific display mode in an aspect used under a special condition is not displayed immediately after the reversing operation. Accordingly, the complicated operation to convert the specific display mode into another display mode is unnecessary.

An image of a display mode used for final adjustment of a parking position is not displayed immediately after the reversing is started.

An image of a display mode used to monitor clearance between a rear end of the vehicle and an object around the rear end of the vehicle is not displayed immediately after the reversing is started.

BEST MODE TO CARRY OUT THE INVENTION

Hereinafter, an embodiment of the present invention will be described with reference to the drawings.

1. Configuration

Figure 1:
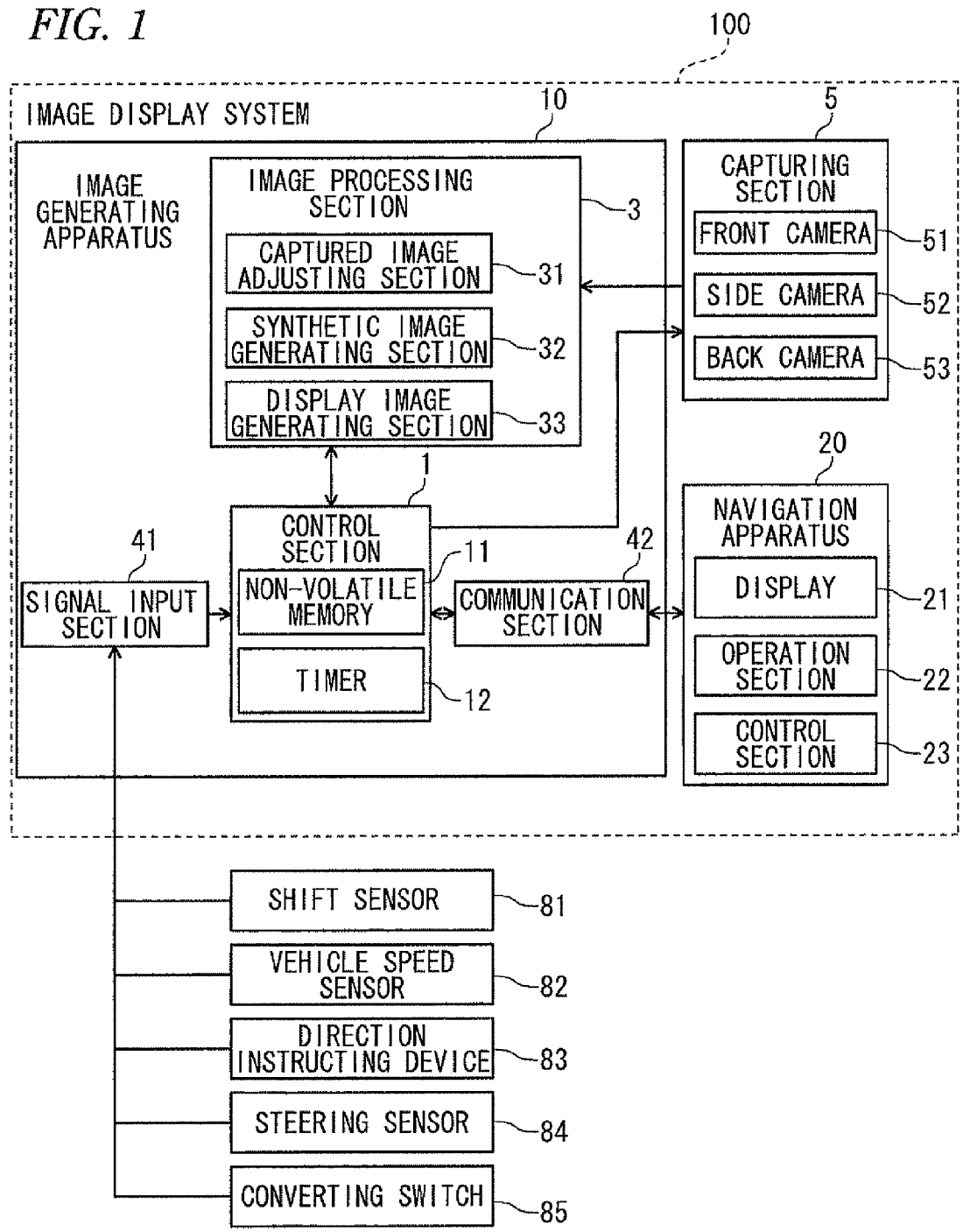
FIG. 1 is a block view of an image display system.

FIG. 1 is a block view of an image display system 100 according to an embodiment of the present invention. The image display system 100 is mounted on a vehicle (a car in the present embodiment) and has a function of capturing the periphery of the vehicle to generate an image and display the image in the inside of the vehicle. A user of the image display system 100 who is a driver of the vehicle can easily monitor the periphery of the vehicle by using the image display system 100.

As illustrated in FIG. 1, the image display system 100 includes a capturing section 5 that captures the periphery of the vehicle, an image generating apparatus 10 that generates a display image showing the periphery of the vehicle, and a navigation apparatus 20 that provides various information to the driver of the vehicle. The image generating apparatus 10 is configured by ECU (Electronic Control Unit) having an image generating function and disposed at a predetermined position of the vehicle.

The navigation apparatus 20 carries out navigation guide to the driver. The navigation apparatus 20 includes a display 21 such as a liquid crystal that has a touch panel function, an operating section 22 that is operated by the driver, and a control section 23 that controls the apparatus as a whole. The navigation apparatus 20 is provided on an instrument panel or others of the vehicle so that the screen of the display 21 can be seen from the driver. Various instructions from the driver are received by the operating section 22 and the display 21 as a touch panel. The control section 23 is configured by a computer having CPU, RAM, ROM, and others. Various functions including the navigation function are accomplished in the manner that the CPU carries out calculation processing in accordance with predetermined programs.

The navigation apparatus 20 is communicably connected to the image generating apparatus 10. The navigation apparatus 20 can transmit and receive various control signals with the image generating apparatus 10 or receive a display image generated in the image generating apparatus 10. The display 21 usually displays a map image for navigation guide. However, the display 21 displays a display image generated in the image generating apparatus 10 and showing the vehicle periphery, in response to predetermined operation by the driver or a signal or others from the image generating apparatus 10. Accordingly, the navigation apparatus 20 also functions as a display apparatus that receives a display image generated in the image generating apparatus 10 and displays the image.

Figure 2:
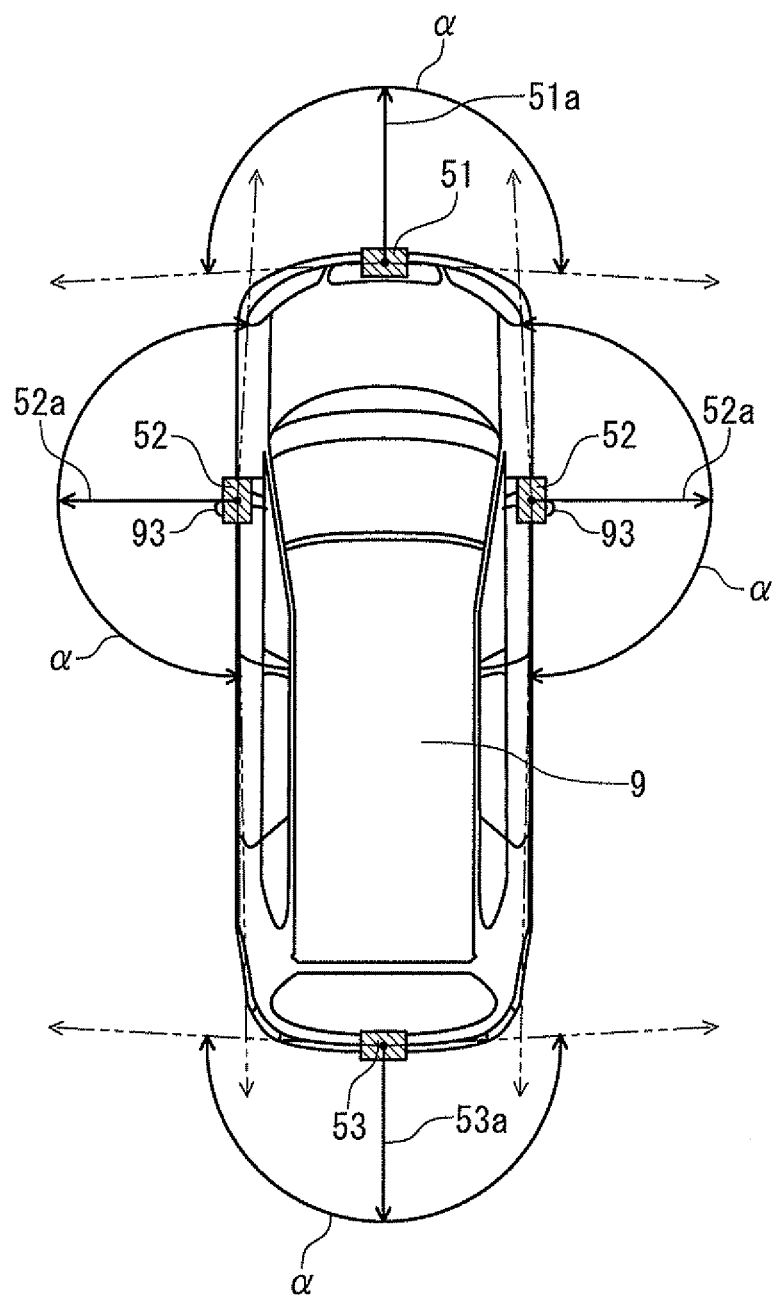
FIG. 2 is a view showing positions where vehicle mounting cameras are disposed on a vehicle.

The capturing section 5 is electrically connected to the image generating apparatus 10 and operated based on a signal from the image generating apparatus 10. The capturing section 5 includes vehicle monitoring cameras, i.e., a front camera 51, side cameras 52, and a back camera 53. The vehicle mounting cameras 51, 52, and 53 include lenses and imaging elements and electronically acquire images, FIG. 2 is a view showing positions where the vehicle mounting cameras 51, 52, and 53 are disposed on the vehicle 9. As illustrated in FIG. 2, the front camera 51 is provided near a position where a number plate is provided at the front end of the vehicle 9. An optical axis 51a of the front camera 51 is toward the straight direction of the vehicle 9. The side cameras 52 are provided on left and right door mirrors 93, respectively. Optical axes 52a of the side cameras 52 are toward an outside direction of the vehicle 9 to be orthogonal to the straight direction. The back camera 53 is provided near a position where a number plate is provided at the rear end of the vehicle 9. An optical axis 53a of the back camera 53 is toward a reverse direction of the straight direction of the vehicle 9. The front camera 51 or the back camera 53 is preferably provided in substantially a center of the left and the right, but may be positioned somewhat out of the center of the left and the right toward the left or right direction.

For the lenses of the vehicle mounting cameras 51, 52, and 53, fish-eye lenses or others are adopted. The vehicle mounting cameras 51, 52, and 53 have at least 180° of an angle of view α. Accordingly, if the four vehicle mounting cameras 51, 52, and 53 are used, it is possible to capture the entire circumference of the vehicle 9.

Returning to FIG. 1, the image generating apparatus 10 includes a control section 1 that controls the apparatus as a whole, an image processing section 3 that processes a captured image acquired from the capturing section 5 and generates a display image, and a communication section 42 that communicates with the navigation apparatus 20. Various instructions received from the driver through the operating section 22 or the display 21 of the navigation apparatus 20 are received by the communication section 42 as control signals and input into the control section 1. Accordingly, the image generating apparatus 10 can implement operation in response to the driver's operation to the navigation apparatus 20.

The image processing section 3 is configured by a hardware circuit capable of processing various images and includes a captured image adjusting section 31, a synthetic image generating section 32, and a display image generating section 33 as main functions. The captured image adjusting section 31 adjusts a captured image acquired from the capturing section 5 to be a display image. The captured image adjusting section 31 implements adjustment of image quality of a captured image such as brightness or contrast, distortion amendment of an image so that the image is naturally displayed, or others. The synthetic image generating section 32 generates a synthetic image viewed from a certain virtual viewpoint in the vicinity of the vehicle 9, based on a plurality of captured images that have been acquired from the plurality of vehicle mounting cameras 51, 52, and 53 of the capturing section 5. How the synthetic image generating section 32 generates a synthetic image viewed from a virtual viewpoint will be described hereafter.

The display image generating section 33 generates a display image to be provided to the driver, by using one or combination of a plurality of images from the captured images that have been adjusted in the captured image adjusting section 31 and the synthetic images that have been generated by the synthetic image generating section 32. The generated display image is output to the navigation apparatus 20 by the communication section 42, and displayed on the display 21 of the navigation apparatus 20.

The control section 1 is configured by a computer having CPU, RAM, ROM, and others. Various control functions are accomplished in the manner that the CPU carries out calculation processing in accordance with predetermined programs. The functions of the control section 1 that are accomplished as described above include a function of controlling image processing that is implemented by the image processing section 3, i.e., a function of controlling contents of a display image. Various parameters needed to generate synthetic images in the synthetic image generating section 32 are instructed by the functions of the control section 1. The control section 1 also includes a non-volatile memory 11 configured by a flash memory or others, and a timer 12 having a measuring function.

The image generating apparatus 10 also includes a signal input section 41 that inputs signals from various apparatuses provided in the vehicle 9. Signals from the outside of the vehicle 9 are input to the control section 1, through the signal input section 41. Specifically, signals presenting various information are input from a shift sensor 81, a vehicle speed sensor 82, a direction instructing device 83, a steering sensor 84, a converting switch 85, and others to the control section 1. Meanwhile, the image display system 100 may be configured to include parts or all of the shift sensor 81, the vehicle speed sensor 82, the direction instructing device 83, the steering sensor 84, and the converting switch 85.

From the shift sensor 81, a position of operation of a shift lever in the transmission of the vehicle 9, i.e., a shift position such as "P (parking)," "D (driving)," "N (neutral)," or "R (reversing)" is input. From the vehicle speed sensor 82, a driving speed (km/h) of the vehicle 9 at that time is input.

From the direction instructing device 83, a direction instruction based on operation of a winker switch, i.e., a turn signal presenting a direction instruction intended by the driver of the vehicle 9 is input. When the winker switch is operated, a turn signal is generated. The turn signal presents the operated direction (left or right direction). When the winker switch is in a neutral position, the turn signal is off.

From the steering sensor 84, a direction of rotation of a steering wheel by the driver and an angle of the rotation are input. The converting switch 85 is a switch that receives an instruction to convert an aspect of a display image from the driver. From the converting switch 85, a signal presenting an instruction of the driver is input to the control section 1.

2. Image Conversion Processing

Figure 3:
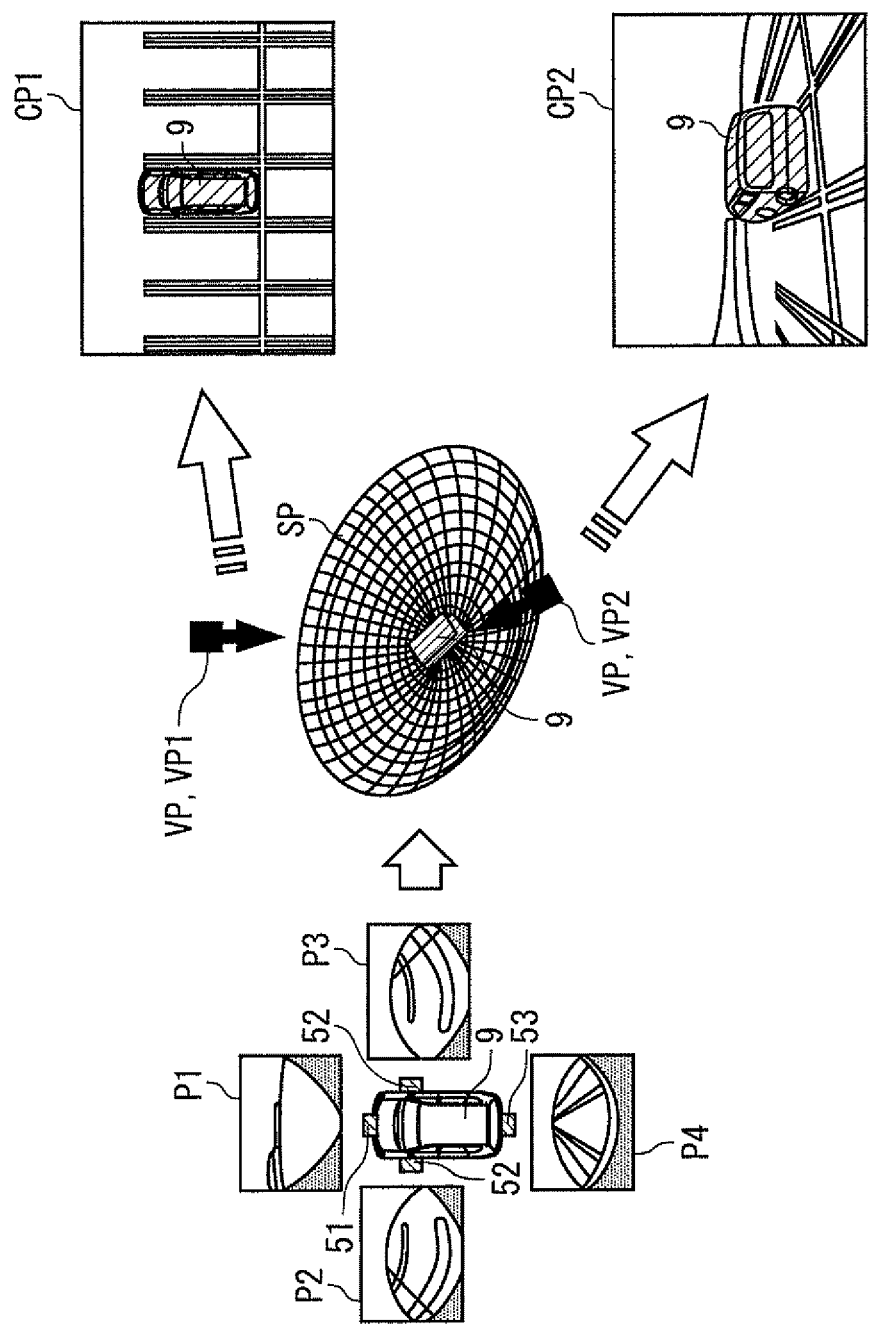
FIG. 3 is an explanatory view of a method for generating a synthetic image viewed from a virtual viewpoint.

Next, how the synthetic image generating section 32 of the image processing section 3 generates a synthetic image viewed from a certain virtual viewpoint based on a plurality of captured images that have been obtained from the capturing section 5. FIG. 3 is an explanatory view of a method of generating a synthetic image viewed from a certain virtual viewpoint.

When the front camera 51, the side cameras 52, and the back camera 53 of the capturing section 5 capture images at the same time, four captured images P1 to P4 presenting the front side, the left and right directions, and the rear side of the vehicle 9, respectively, are acquired. That is, the four captured images P1 to P4 acquired from the capturing section 5 include information presenting the entire circumference of the vehicle 9 at the capturing time.

After the four captured images P1 to P4 are multiplexed, they are projected onto an imaginary three-dimensional curved surface SP. For example, the three-dimensional curved surface SP is substantially in a hemisphere (bowl) shape. The central part of the three-dimensional curved surface SP (bottom part of a bowl) is set as a position of the vehicle 9. A corresponding relation between a position of each pixel included in the captured images P1 to P4 and a position of each pixel of the three-dimensional curved surface SP is predetermined. Accordingly, a value for each pixel of the three-dimensional curved surface SP can be determined based on the corresponding relation and a value for each pixel included in the captured images P1 to P4. The corresponding relation between a position of each pixel of the captured images P1 to P4 and a position of each pixel of the three-dimensional curved surface SP is stored as table data in the non-volatile memory 11 of the control section 1 or others.

Meanwhile, a virtual viewpoint VP to the three-dimensional curved surface SP is set by the control section 1 at a certain viewpoint position in the vicinity of the vehicle toward a certain visual field direction. The virtual viewpoint VP is defined with the viewpoint position and the visual field direction. In accordance with the set virtual viewpoint VP, a necessary area on the three-dimensional curved surface SP is cut out as an image, so that a synthetic image viewed from the certain virtual viewpoint is generated.

For example, in case of setting a virtual viewpoint VP1, in which the viewpoint position is a position directly above substantially a center of the vehicle 9, and the visual field direction is substantially a direct downward direction, a synthetic image CP1 looking down the vehicle 9 from substantially directly above the vehicle 9 is generated. As illustrated in the same drawing, in case of setting a virtual viewpoint VP2, in which the viewpoint position is a left rear position of the vehicle 9, and the visual field direction is substantially a front direction of the vehicle 9, a synthetic image CP2 looking the entire periphery of the vehicle 9 from the left rear side of the vehicle 9 is generated. A relation between the virtual viewpoint VP and the necessary area on the three-dimensional curved surface SP is predetermined and stored as table data in the non-volatile memory 11 of the control section 1.

When a synthetic image is actually generated, there is no need to determine values for all pixels of the three-dimensional curved surface SP. Values only for pixels of the necessary area in correspondence to the set virtual viewpoint VP is determined based on the captured images P1 to P4, thereby increasing the processing speed.

An image of the vehicle 9 to be presented in a synthetic image is prepared in advance as data such as a bit map and stored in the non-volatile memory 11 or others. When a synthetic image is generated, data for the image of the vehicle 9 in the shape in accordance with the viewpoint position and the visual field direction of the virtual viewpoint VP of the synthetic image as described above are read, so that they are overlapped within the synthetic image. Meanwhile, in the drawing, the actual vehicle and the image of the vehicle to be presented in an image are denoted by the same reference numeral 9.

3. Operation Mode

Figure 4:
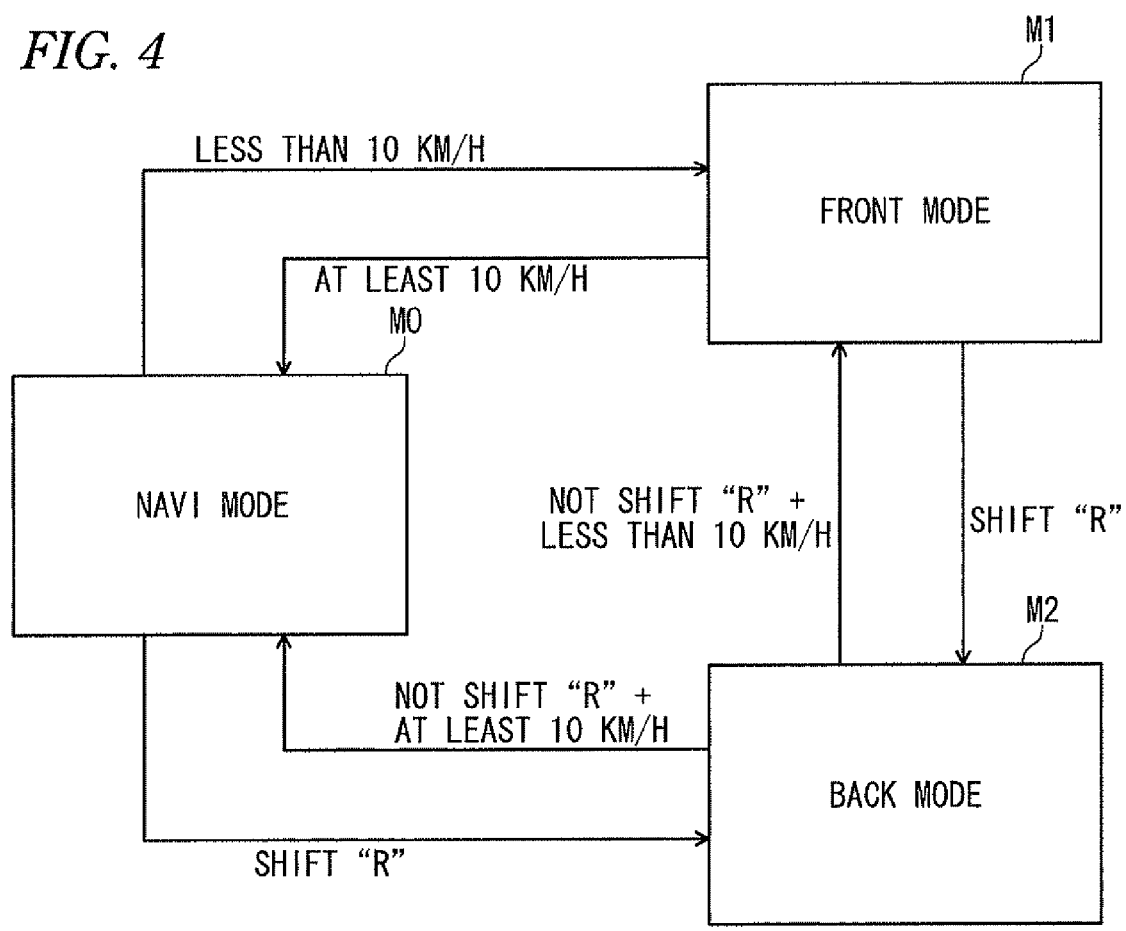
FIG. 4 is a view showing transition of an operation mode of the image display system.

Next, operation of the image display system 100 will be described. FIG. 4 is a view showing transition of an operation mode of the image display system 100. The image display system 100 has three operation modes that include a navi mode M0, a front mode M1, and a back mode M2. The operation modes are converted by control of the control section 1 in accordance with operation by the driver or a driving state.

The navi mode M0 is an operation mode that displays a map image for navigation guide or others on the display 21, through the function of the navigation apparatus 20. In the navi mode M0, the functions of the capturing section 5 and the image generating apparatus 10 are not used. Various displays are accomplished by the function of the navigation apparatus 20 as a single unit. Accordingly, if the navigation apparatus 20 has a function of receiving and displaying a TV broadcasting radio wave, instead of the map image for navigation guide, a TV broadcasting screen may be displayed.

The front mode M1 and the back mode M2 are operation modes that display a display image presenting peripheral circumferences of the vehicle 9 in real time on the display 21, by using the functions of the capturing section 5 and the image generating apparatus 10. The front mode M1 is an operation mode that effectuates a function of a front monitor to display a display image primarily presenting a front region or a side region of the vehicle 9, which is necessary upon advancing the vehicle 9. The back mode M2 is an operation mode that effectuates a function of a back monitor to display a display image primarily presenting a rear region of the vehicle 9, which is necessary upon reversing the vehicle 9.

In case of the navi mode M0, for example, if the driving speed input from the vehicle speed sensor 82 is less than 10 km/h, the navi mode M0 is converted into the front mode M1.

In case of the front mode M1, for example, if the driving speed is at least 10 km/h, the front mode M1 is converted into the navi mode M0.

If the driving speed of the vehicle 9 is relatively high, the front mode M1 is released to enable the driver to concentrate on the driving. Reversely, if the driving speed of the vehicle 9 is relatively low, it is highly likely that the driver is performing driving in consideration of peripheral circumstances of the vehicle 9, e.g., entering into a crossroad where views are poor, changing a direction, and moving toward a roadside. Accordingly, when the driving speed is relatively low, the operation mode is converted into the front mode M1 primarily presenting a front region or a side region of the vehicle 9. Meanwhile, in the case where the operation mode is converted from the navi mode M0 into the front mode M1, a condition that an explicit operation instruction has been made from the driver may be added to the condition that the driving speed is less than 10 km/h.

In case of the navi mode M0 or the front mode M1, if a position of the shift lever input from the shift sensor 81 is "R (reversing)," the navi mode M0 or the front mode M1 is converted into the back mode M2. In other words, when the transmission of the vehicle 9 is operated to be positioned at "R (reversing)," the vehicle 9 is in the reversing state, so that the operation mode is converted into the back mode M2 primarily presenting a rear region of the vehicle 9.

In case of the back mode M2, when the position of the shift lever is a position other than "R (reversing)," the back mode M2 is converted into the navi mode M0 or the front mode M1 depending on the driving speed at that time. If the driving speed is at least 10 km/h, the back mode M2 is converted into the navi mode M0. If the driving speed is less than 10 km/h, the back mode M2 is converted into the front mode M1.

Hereinafter, an aspect for displaying the periphery of the vehicle 9 in each of the front mode M1 and the back mode M2 will be described in detail.

4. Front Mode

Figure 5:
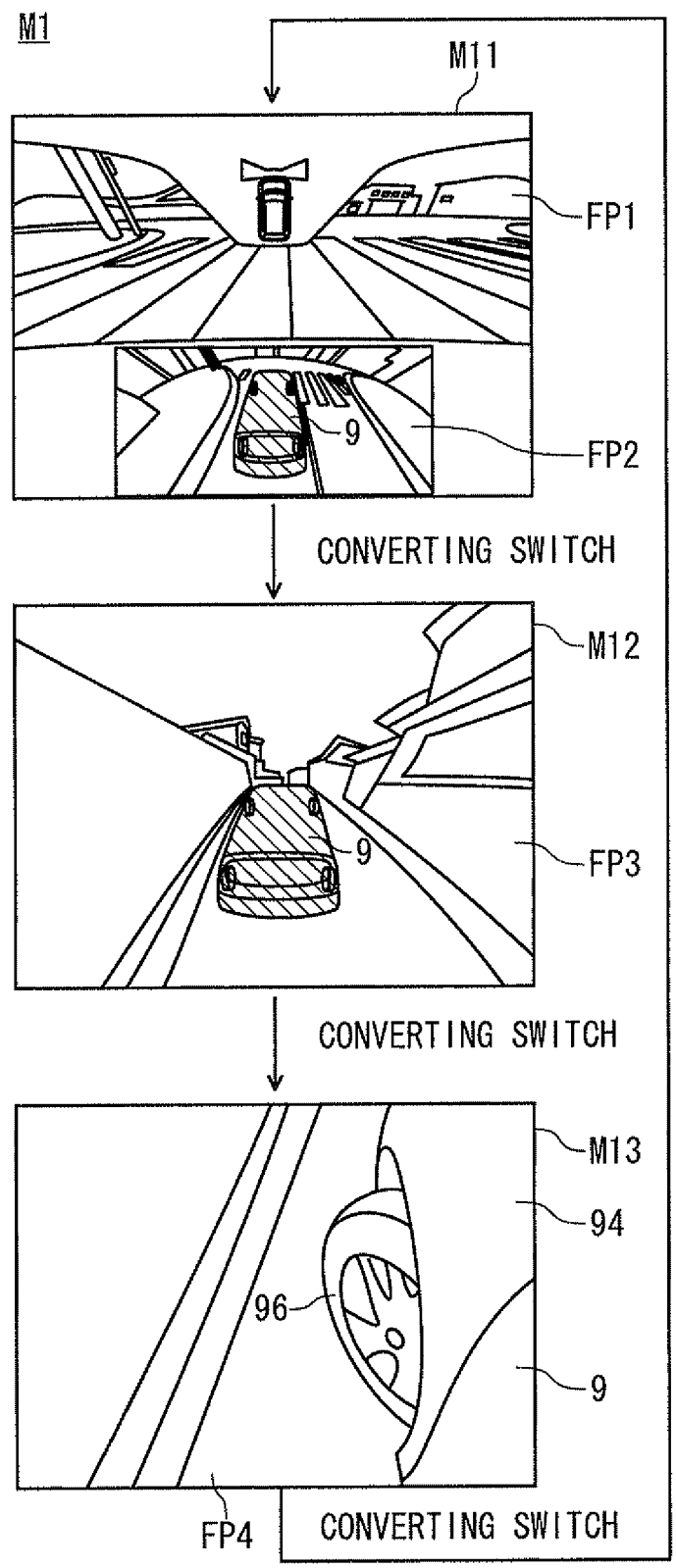
FIG. 5 is a view showing transition of a display mode in a front mode.

First, a display aspect of the front mode M1 will be described. FIG. 5 is a view showing transition of a display mode in the front mode M1. The front mode M1 includes three display modes, i.e., a binary image mode M11, a single image mode M12, and a side camera mode M13. The display modes are different in a display aspect. Each time the driver presses the converting switch 85, the display modes are converted into the binary image mode M11, the single image mode M12, and the side camera mode M13 in this order by control of the control section 1. In case of the side camera mode M13, when the converting switch 85 is pressed, the side camera mode 13 is returned again to the binary image mode M11.

The binary image mode M11 is a display mode that displays a display image including a front image FP1 obtained from capturing in the front camera 51 and a synthetic image FP2 viewed from the virtual viewpoint VP side by side on the display 21. In the binary image mode M11, two images, i.e., the front image FP1 and the synthetic image FP2 are displayed on the same screen.

The single image mode M12 is a display mode that displays a display image including only a synthetic image FP3 viewed from the virtual viewpoint VP on the display 21. The side camera mode M13 is a display mode that displays a display image including only a side image FP4 obtained from capturing in the side cameras 52 on the display 21.

<4-1. 2 Image Mode>
<4-1-1. Visual Field Scope>

Figure 6:
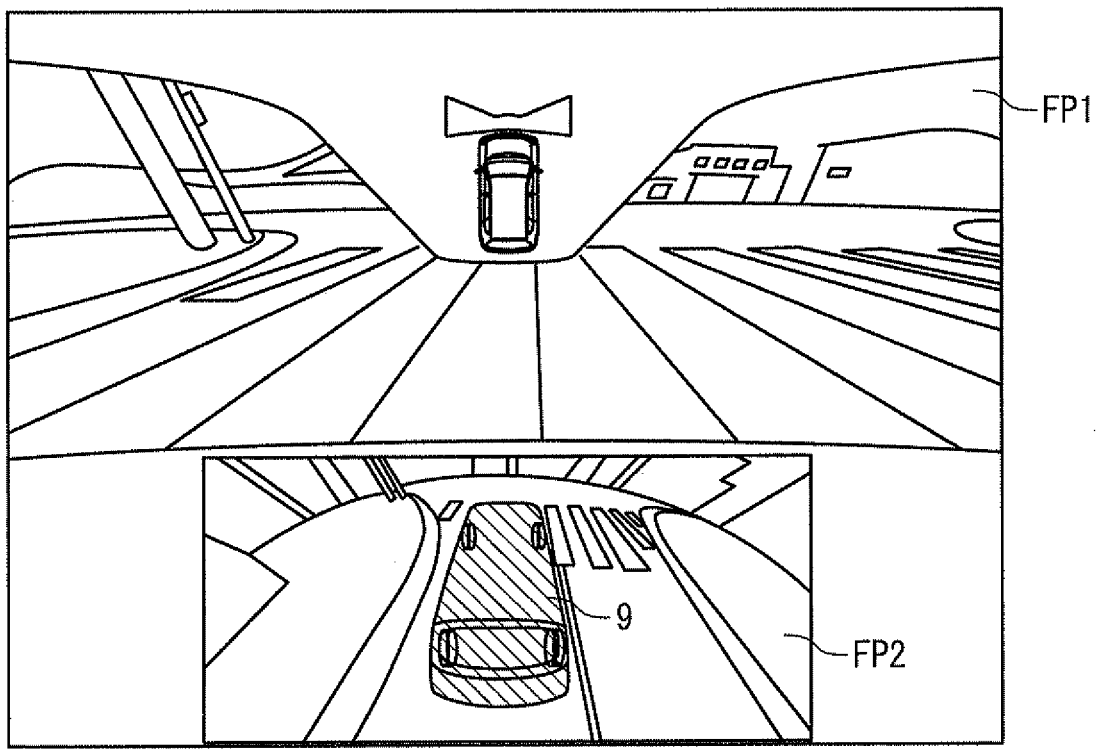
FIG. 6 is a view showing an example of a display image of a binary image mode.

FIG. 6 is a view showing an example of a display image to be displayed on the display 21 in the binary image mode M11. As illustrated in FIG. 6, on a display image of the binary image mode M11, a front image FP1 is disposed at an upper part, and a synthetic image FP2 is disposed at a lower part. The front image FP1 is not a synthetic image from the virtual viewpoint VP, but is a display image obtained in the manner that a captured image obtained from capturing in the front camera 51 is adjusted in the image adjusting section 31 to be a display image. The synthetic image FP2 is a synthetic image that includes the side region of the vehicle 9 viewed from the virtual viewpoint VP directed from the rear position of the vehicle 9 toward the front of the vehicle 9.

Figure 7:
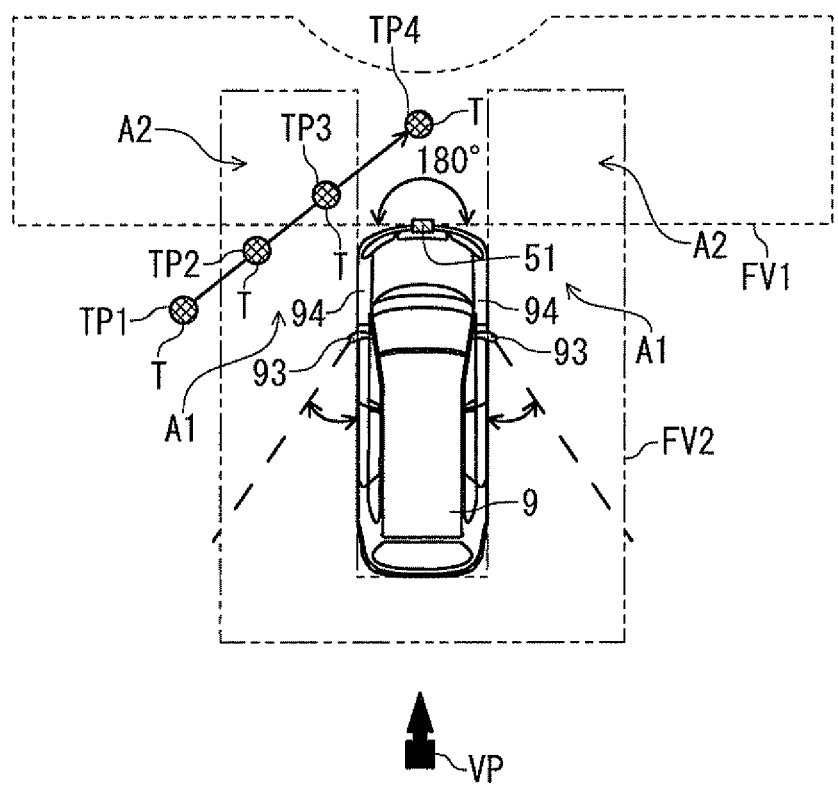
FIG. 7 is an explanatory view of a visual field scope presented in a binary image mode.

FIG. 7 is an explanatory view of a visual field scope presented in the binary image mode M11 in the vicinity of the vehicle 9. In FIG. 7, a scope FV1 presented by a dashed line is a visual field scope presented on the front image FP1. A scope FV2 presented by a chain double-dashed line is a visual field scope presented on the synthetic image FP2. The visual field scopes FV1 and FV2 partially overlap with each other in an area A2, which is a boundary of the scopes.

On the front image FP1, an area of a 180° horizontal angle expanded in the left and right direction in the front region of the vehicle 9 is set as the visual field scope FV1. Accordingly, the driver sees the front image FP1 so that he/she can recognize an object existing in the left and right front sides of the vehicle 9 that can be easily blinded when entering into a crossroad where views are poor.

On the synthetic image FP2, a scope that includes the left and right side regions of the vehicle 9 from the front of the front end of the vehicle 9 to the rear of the rear end of the vehicle 9, and the rear region of the vehicle 9 is set as the visual field scope FV2. Accordingly, the driver sees the synthetic image FP2 so that he/she can recognize an object existing in the side regions or the rear region. When performing changing a direction, moving toward a roadside, or others, the driver can easily monitor an area that may be easily blinded from the driver's seat, e.g., an area A1 near the outside of a front fender 94 that is not seen on the door mirror 93.

In the binary image mode M11, the two images FP1 and FP2 of the visual field scopes FV1 and FV2 can be seen at the same time without converting a screen (refer to FIG. 6), so that the driver can monitor peripheral circumstances of the vehicle 9 at once.

The viewpoint position of the virtual viewpoint VP of the synthetic image FP2 is set to the rear position of the vehicle 9. The visual field direction is set to the front direction of the vehicle 9. Accordingly, as illustrated in FIG. 6, the synthetic image FP2 shows the periphery of the vehicle 9 in the state that the vehicle 9 is viewed from the rear position of the vehicle 9 toward the front direction, together with the image of the vehicle 9. Since the visual field direction of the front image FP1, the visual field direction of the synthetic image FP2, and the visual field direction of the driver are substantially identical, the driver is not confused of the direction toward which an object presented on the image exists. The driver does not need to make complicated thinking such as conducting coordinate transformation in his/her mind, so that the driver can intuitively recognize the positional relation between an object displayed on the display 21 and the vehicle 9.

Compared to the case of using an image looking down the vehicle 9 from directly above the vehicle 9, the positional relation regarding to which portion of the vehicle 9 an object around the vehicle 9 is closed is easily recognized. On the synthetic image FP2 viewed from the virtual viewpoint directed from the rear position of the vehicle 9 toward the front direction, the front region that is an advancing direction of the vehicle 9, as well as the side region of the vehicle 9 are presented. Accordingly, compared to the case of using an image looking down the vehicle 9 from directly above the vehicle 9, it is easily predicted how the positional relation between the vehicle 9 and an object around the vehicle 9 varies depending on advancing of the vehicle 9. Accordingly, when the vehicle 9 is advanced, the vehicle 9 is effectively prevented from contacting with an object around the vehicle 9.

Figure 8:
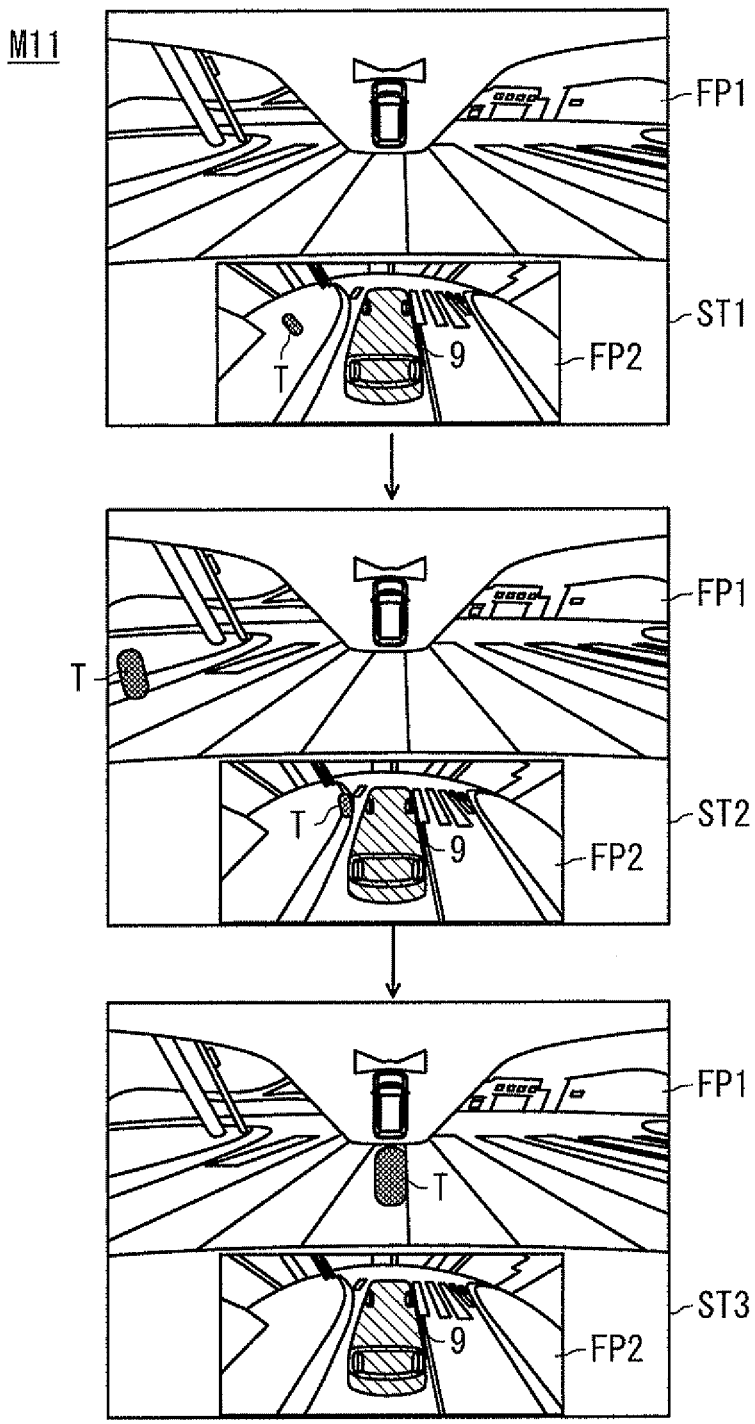
FIG. 8 is a view showing an example of screen display in a binary image mode.

As illustrated in FIG. 7, it is assumed that a certain object T moves around the vehicle 9 over the visual field scopes FV1 and FV2 of the two images FP1 and FP2. Specifically, the object T moves from a position TP1 out of the visual field scope of the binary image mode M11 to a position TP2 of the area A1 within the visual field scope FV2, to a position TP3 within the overlapping area A2 of the visual field scope FV1 and the visual field scope FV2, and finally, to a position TP4 of the front side of the vehicle 9 within the visual field scope FV1. FIG. 8 is a view showing an example of screen display of the display 21 in the binary image mode M11, in the case where the object T moves as described above.

When the object T moves from the position TP1 out of the visual field scope to the position TP2 within the visual field scope FV2 of the synthetic image FP2, the object T first appears on the synthetic image FP2 of the lower portion of the screen (state ST1). At this viewpoint, the object T has not appeared on the front image FP1 of the upper portion of the screen. Subsequently, when the object T moves to the position TP3 within the overlapping area A2 of the visual field scope FV1 and the visual field scope FV2, the object T appears on both the front image FP1 and the synthetic image FP2 (state ST2). When the object T moves into the position TP4 within the visual field scope FV1 of the front image FP1, the object T appears on the front image FP1 (state ST3).

Even in the case where the object T moves over the visual field scopes FV1 and FV2 of the two images FP1 and FP2 around the vehicle 9, since the visual field direction of the front image FP1 and the visual field direction of the synthetic image FP2, and the visual field direction of the driver are substantially identical, the object T moves in substantially the same direction on any of the two images FP1 and FP2. Accordingly, the driver can intuitively recognize the movement of the object T. Since there is the area A2 that is a boundary where the visual field scope FV1 and the visual field scope FV2 overlap with each other, there is a scene where the object T appears on both the front image FP1 and the synthetic image FP2 at the same time. Accordingly, the movement of the object T can be recognized in a continuous manner.

In the binary image mode M11, much information is provided to the driver. However, the driver can intuitively recognize peripheral circumstances of the vehicle 9 as described above. Accordingly, the driver can made an exact decision so that driving safety can be sufficiently assured.

<4-1-2. Interaction of Operation of a Direction Instructing Device>

Figure 9:
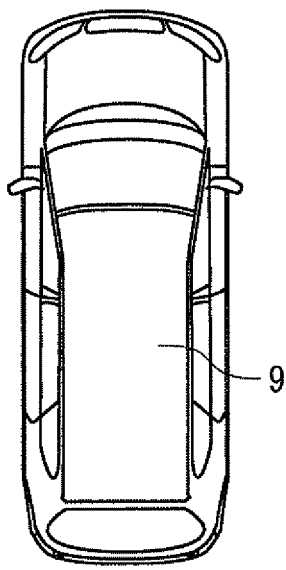
FIG. 9 is a view showing transition of a viewpoint position of a virtual viewpoint.
Figure 9:
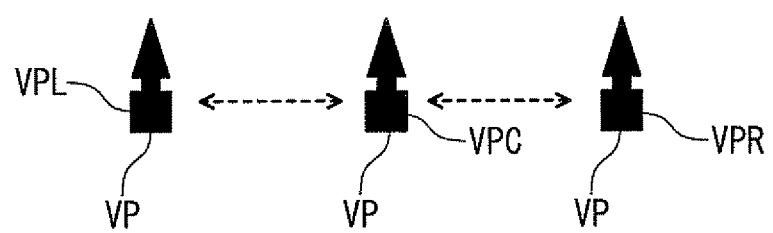

In the binary image mode M11, the viewpoint position of the virtual viewpoint VP of the synthetic image FP2 moves by control of the control section 1, in response to driver's operation to the winker switch of the direction instructing device 83. FIG. 9 is a view showing transition of the viewpoint position of the virtual viewpoint VP.

If a turn signal input from the direction instructing device 83 is off, namely, there is no direction instruction, the viewpoint position of the virtual viewpoint VP is set to a position VPC substantially in a center of the left and the right at the rear of the vehicle 9, and the visual field direction is set to the front direction of the vehicle 9. Accordingly, as illustrated in FIG. 6, the synthetic image FP2 that substantially equally includes the left and right side regions of the vehicle 9 is generated.

Figure 10:
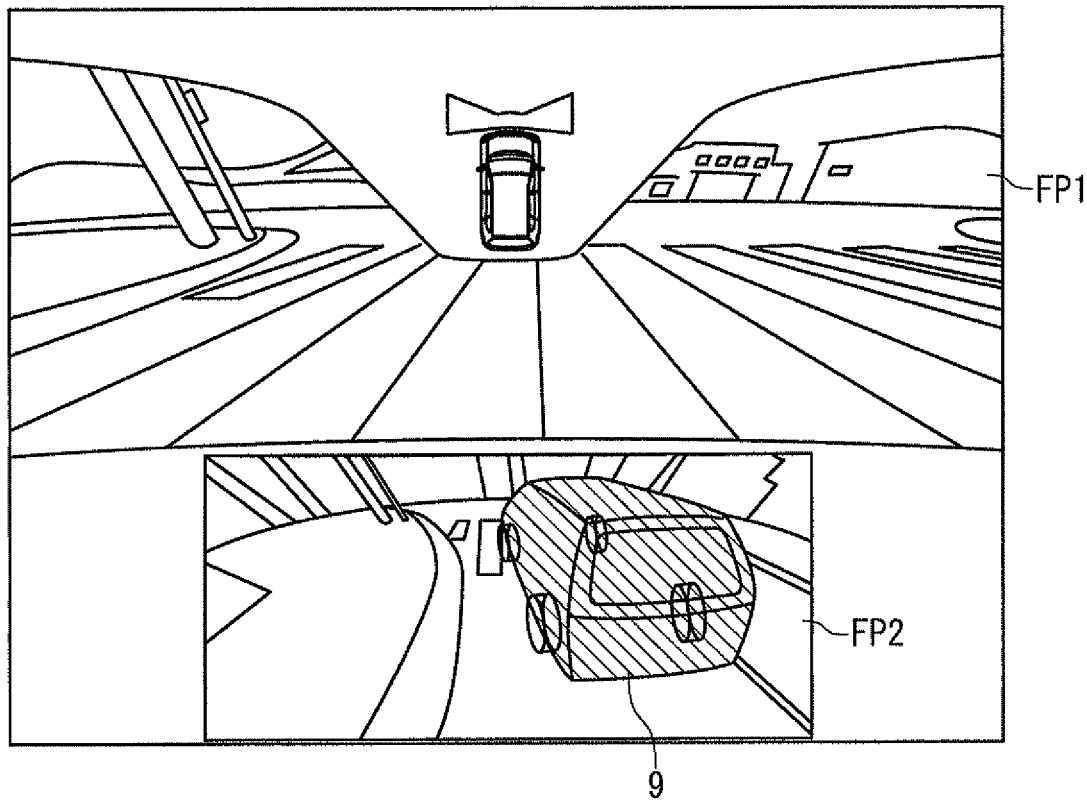
FIG. 10 is a view showing an example of a display image of a binary image mode.

If the turn signal input from the direction instructing device 83 is on, namely, there is a direction instruction, the viewpoint position of the virtual viewpoint VP moves into the position of the direction indicated by the turn signal, in the state that the visual field direction of the virtual viewpoint VP is the front direction of the vehicle 9. Specifically, if the turn signal indicates a left direction, the viewpoint position of the virtual viewpoint VP is set to a position VPL of the left side of the vehicle 9. Accordingly, as illustrated in FIG. 10, the synthetic image FP2 that more widely presents the side region of the left direction indicated by the turn signal than the side region of the right direction is generated and displayed on the display 21. In this case as well, the synthetic image FP2 shows the periphery of the vehicle 9 in the state that the vehicle 9 is viewed from the rear position of the vehicle 9 to the front direction.

Figure 11:
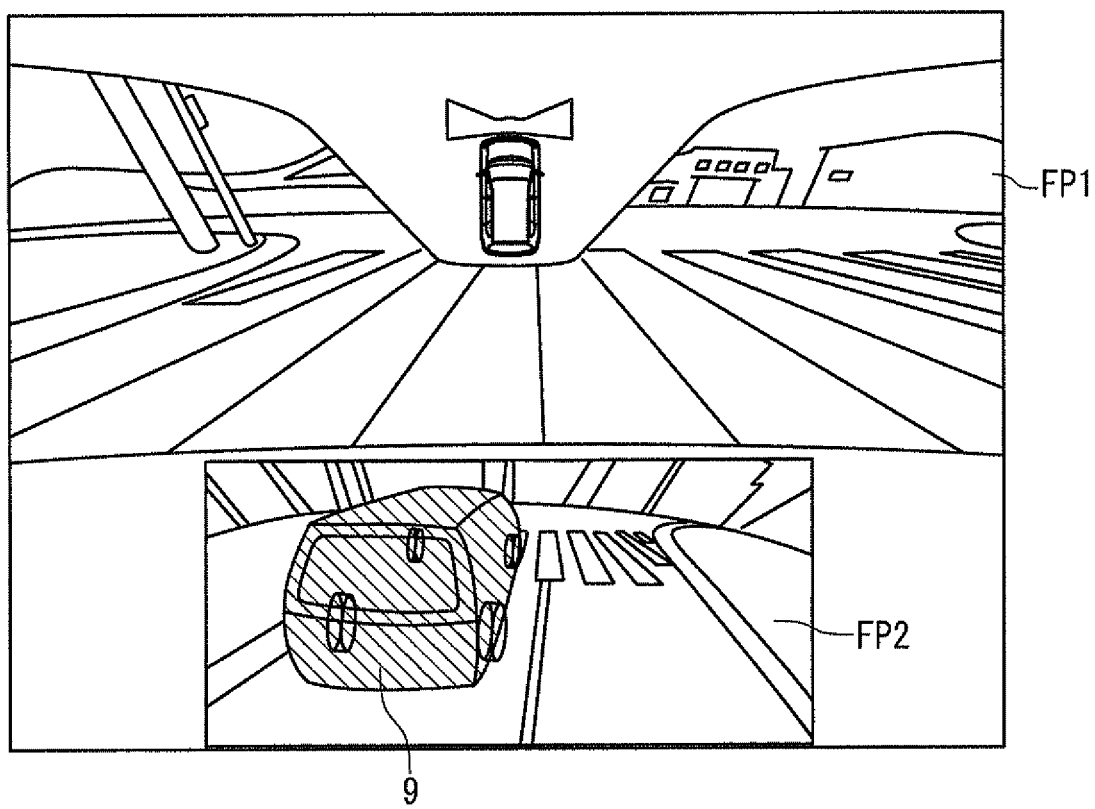
FIG. 11 is a view showing an example of a display image of a binary image mode.

If the turn signal indicates a right direction, the viewpoint position of the virtual viewpoint VP is set to a position VPR of the right side of the vehicle 9. Accordingly, as illustrated in FIG. 11, the synthetic image FP2 that more widely presents the side region of the right direction indicated by the turn signal of the direction instructing device 83 than the side region of the left direction is generated and displayed on the display 21. In this case as well, the synthetic image FP2 shows the periphery of the vehicle 9 in the state that the vehicle 9 is viewed from the rear position of the vehicle 9 to the front direction.

In the direction instructed by the direction instructing device 83, there is most likely an object, with which the vehicle 9 may contact when the vehicle 9 moves upon changing a direction or moving toward a roadside. The side region of the direction instructed by the direction instructing device 83 is widely presented, so that the driver can pay his/her attention to the object with which the vehicle 9 may contact. Accordingly, the vehicle 9 can be effectively prevented from contacting with the object.

In this case as well, the synthetic image FP2 shows the periphery of the vehicle 9 in the state that the vehicle 9 is viewed from the rear position of the vehicle 9 to the front direction, together with the image of the vehicle 9. Since the side region of the vehicle 9 appears in the same visual field direction as the visual field direction of the driver, the driver is not confused of the direction, toward which an object presented in an image exists. The driver does not make complicated thinking such as conducting coordinate transformation in his/her mind, so that the driver can intuitively recognize the positional relation between the vehicle 9 and an object. In addition, the driver can easily recognize the positional relation regarding to which portion of the vehicle 9 an object around the vehicle 9 is closed. The driver can easily predict how the positional relation between the vehicle 9 and an object around the vehicle 9 varies depending on driving of the vehicle 9. Accordingly, the driver can make an exact decision in a moment.

Even in the case where the viewpoint position of the virtual viewpoint VP is moved to the left or right side of the vehicle 9, the synthetic image also includes a side region in a reverse direction to one direction indicated by the turn signal. Accordingly, even if an object has existed in a side region in a reverse direction to a direction indicated by the turn signal, the object can be recognized. For example, in the case of temporarily operating the steering wheel in a reverse direction to a direction indicated by the turn signal in order to avoid an object existing in the direction indicated by the turn signal, it is possible to prevent contact with an object existing in the reverse direction.

However, if the winker switch is returned from the operation position to the neutral position, so that the turn signal from the direction instructing device 83 is converted from on to off, the viewpoint position of the virtual viewpoint VP of the synthetic image FP2 is returned to the position VPC substantially in a center of the left and the right. In this case, the viewpoint position of the virtual viewpoint VP is returned to the position VPC substantially in a center of the left and the right, after the turn signal is off and a predetermined time elapses, and not immediately after a turn signal is converted from on to off.

Figure 12:
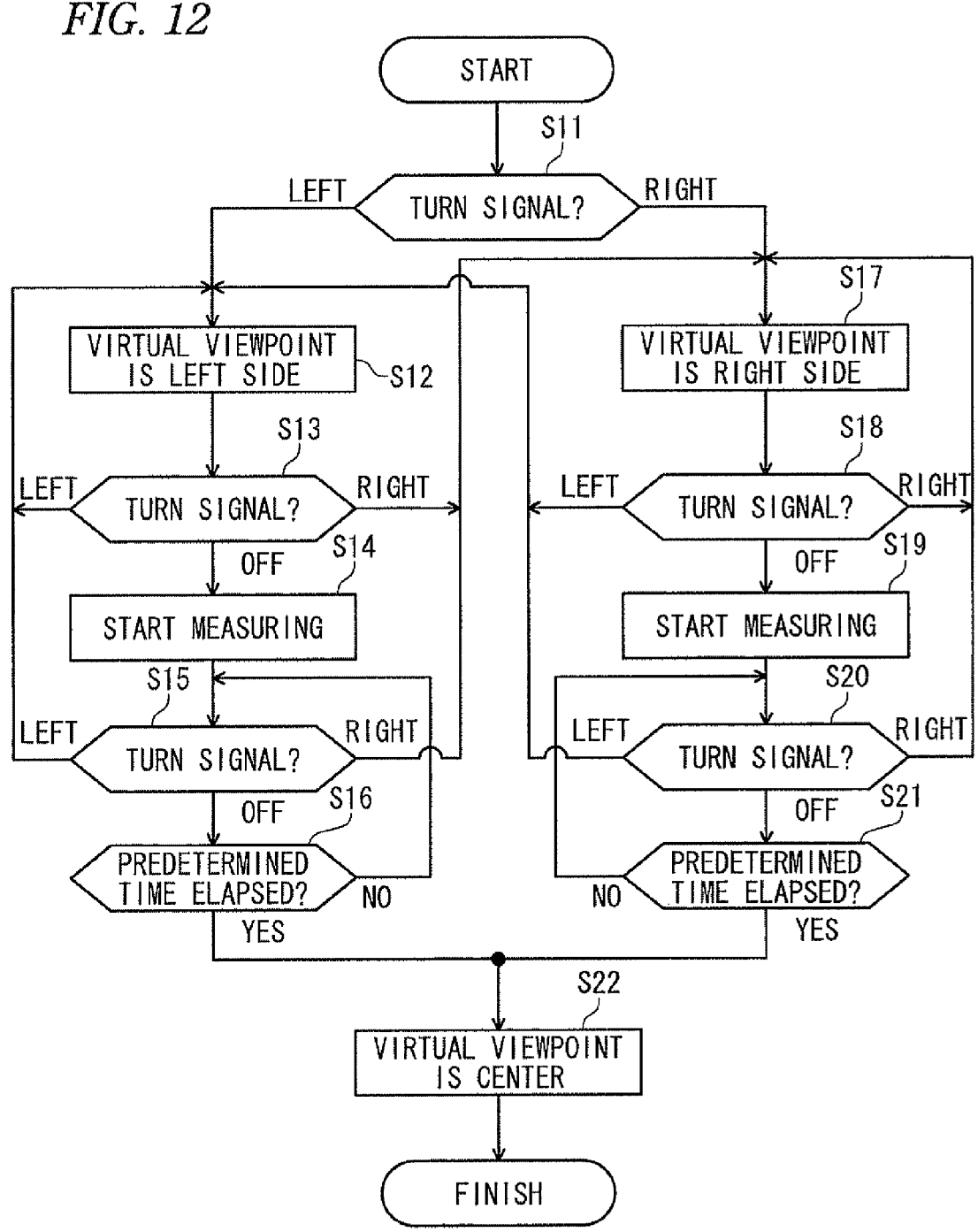
FIG. 12 is a view showing flow of processing to change a viewpoint position of a virtual viewpoint.

FIG. 12 is a view showing flow of processing for changing the viewpoint position of the virtual viewpoint VP. This processing is carried out by control of the control section 1 when the winker switch is operated such that the turn signal is on.

First, a direction indicated by the turn signal of the direction instructing device 83 is determined (S11). If the turn signal indicates a left direction, S12 is carried out. If the turn signal indicates a right direction, S17 is carried out.

In S12, the virtual viewpoint VP is set to the position VPL of the left side. Accordingly, as illustrated in FIG. 10, the synthetic image FP2 that more widely shows the side region of the left direction than the right direction is generated and displayed on the display 21.

Subsequently, in the state that the virtual viewpoint VP is set to the position VPL of the left side, the turn signal state is monitored (S13). If the state that the turn signal indicates a left direction has been maintained, the processing is returned to S12 so that the virtual viewpoint VP is maintained as the position VPL of the left side. In other words, displaying the synthetic image FP2 that relatively widely shows the side region of the left direction is maintained. Meanwhile, if the turn signal indicates a right direction, S17 is carried out.

In S13, if the turn signal is off, namely, a direction instruction has been changed into no direction instruction, measuring by a timer 12 at the time that the turn signal becomes off is started (S14).

The turn signal state is monitored, until a predetermined time elapses from the starting of the measuring (S15 and S16). In the present embodiment, for example, the predetermined time is three seconds. Until the predetermined time elapses, the virtual viewpoint VP is maintained as the position VPL of the left side. And, displaying the synthetic image FP2 that relatively widely shows the side region of the left direction is maintained. If the predetermined time elapses in the state that the turn signal is off (Yes in S16), the viewpoint position of the virtual viewpoint VP is returned to the position VPC substantially in a center of the left and the right (S22). Accordingly, the synthetic image FP2 that substantially equally includes the left and right side regions of the vehicle 9 is displayed.

However, if the turn signal indicates a left direction again in S15, until the predetermined time elapses from the starting of the measuring, the processing is returned to S12 so that the state that the virtual viewpoint VP is the position VPL of the left side is maintained. In other words, displaying the synthetic image FP2 that relatively widely shows the side region of the left direction is maintained. Meanwhile, if the turn signal indicates a right direction in S15, S17 is carried out.

In case of performing changing a direction or moving toward a roadside, the steering wheel is minutely operated. Accordingly, there is a case where the winker switch of the direction instructing device 83 is returned from the operation position to the neutral position, irrespective of the intension of the driver. Thus, the driver continuously operates the winker switch of the direction instructing device 83 in the same direction for a short time. In this case, if the viewpoint position of the virtual viewpoint VP is immediately changed in response to on/off of the turn signal, the viewpoint position of the synthetic image FP2 displayed on the display 21 is frequently converted, so that seeing the synthetic image FP2 becomes difficult. Accordingly, even if the turn signal is off, the viewpoint position of the virtual viewpoint VP should be maintained until the predetermined time elapses, and the viewpoint position of the virtual viewpoint VP should be returned to the position VPC substantially in a center of the left and the right under the condition that the predetermined time has elapsed in the state that the turn signal is off. Accordingly, the occasion that seeing the synthetic image FP2 becomes difficult can be prevented.

As the predetermined time used for the determination is short, it is likely that the viewpoint position of the synthetic image FP2 is frequently converted. As the predetermined time used for the determination is long, the viewpoint position of the synthetic image FP2 is not easily returned to substantially the center. Accordingly, the predetermined time is preferably set to two to four seconds.

The case where the turn signal indicates a left direction has been described. However, the case where the turn signal indicates a right direction is different from the case where the turn signal indicates a left direction only in terms of the left or right direction, and undergoes the same processing as that for the case where the turn signal indicates a left direction. In other words, in S17, the virtual viewpoint VP is set to the position VPR of the right side. Accordingly, as illustrated in FIG. 11, the synthetic image FP2 that more widely shows the side region of the right direction than the left direction is generated and displayed on the display 21.

Subsequently, in the state that the virtual viewpoint VP is set to the position VPR of the right side, the turn signal state is monitored (S18). If the state that the turn signal indicates a right direction is maintained, the processing is returned to S17, so that the virtual viewpoint VP is maintained as the position VPR of the right side. If the turn signal indicates a left direction, S12 is carried out.

In S18, if the turn signal is off, measuring by the timer 12 at the time that the turn signal becomes off is started (S19), and the turn signal state is monitored until the predetermined time elapses from the starting of the measuring (S20 and S21). At this time, until the predetermined time elapses, the virtual viewpoint VP is maintained as the position VPR of the right side. If the predetermined time has elapsed in the state that the turn signal is off (Yes in S21), the viewpoint position of the virtual viewpoint VP is returned to the position VPC substantially in a center of the left and the right (S22). Accordingly, the synthetic image FP2 that substantially equally includes the side regions of the left and right sides of the vehicle 9 is displayed.

However, if the turn signal indicates a right direction again in S20, until the predetermined time elapses from the starting of the measuring, the processing is returned to S17, so that the state that the virtual viewpoint VP is the position VPR of the right side is maintained. In other words, displaying the synthetic image FP2 that relatively widely shows the side region of the right direction is maintained. Meanwhile, if the turn signal indicates a left direction in S20, S12 is carried out.

<4-2. Single Image Mode>

Returning to FIG. 5, a display aspect in the single image mode M12 will be described. In the single image mode M12, the display 21 displays only the synthetic image FP3. The viewpoint position of the virtual viewpoint VP is set to the position substantially in a center of the left and the right at the rear of the vehicle 9, and the visual field direction is set to the front direction of the vehicle 9. Accordingly, the synthetic image FP3 shows the left and right side regions of the vehicle 9 in the state that the vehicle 9 is viewed from the rear position of the vehicle 9 to the front direction. In the case where the vehicle 9 is driven to avoid an oncoming vehicle on a narrow road or the like, both the left and right sides of the vehicle 9 should be monitored. Accordingly, the single image mode M12 in the display aspect described above can be effectively used.

In the single image mode M12 as well, the visual field direction of the synthetic image FP3 is substantially the same as the visual field direction of the driver. Accordingly, the driver can intuitively recognize the positional relation between the vehicle 9 and an object displayed on the display 21.

Figure 13:
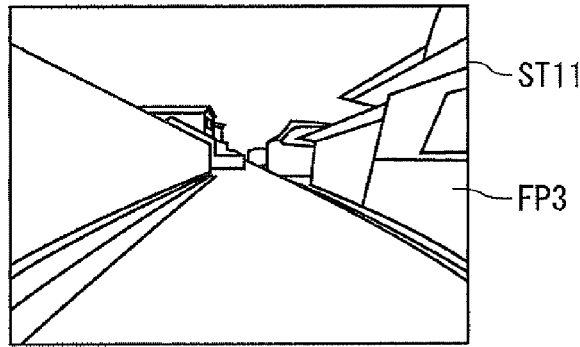
FIG. 13 is a view showing an example of screen display in a single image mode.
Figure 13:
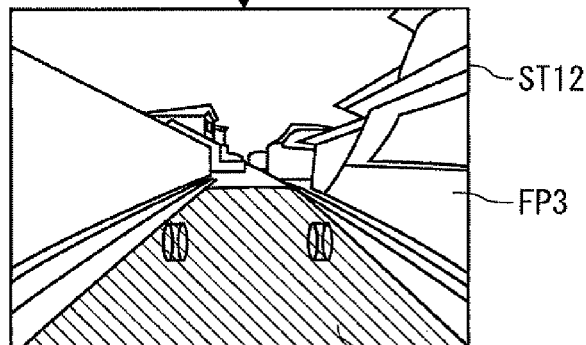
Figure 13:
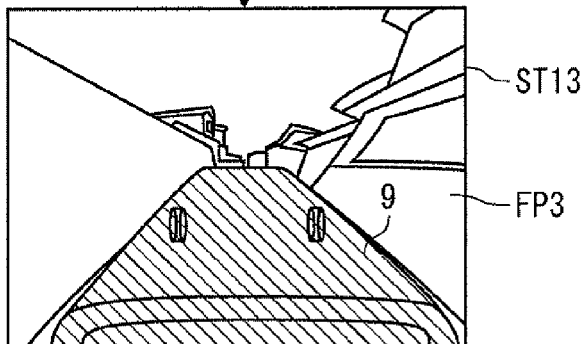
Figure 13:
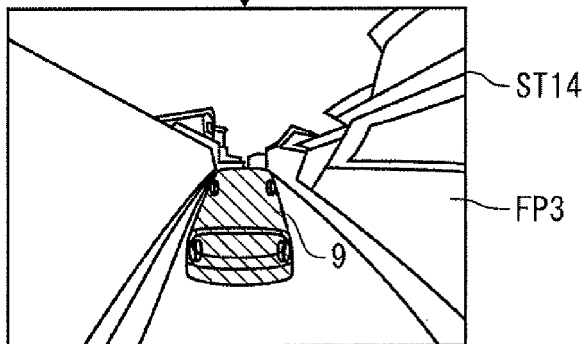
Figure 14:
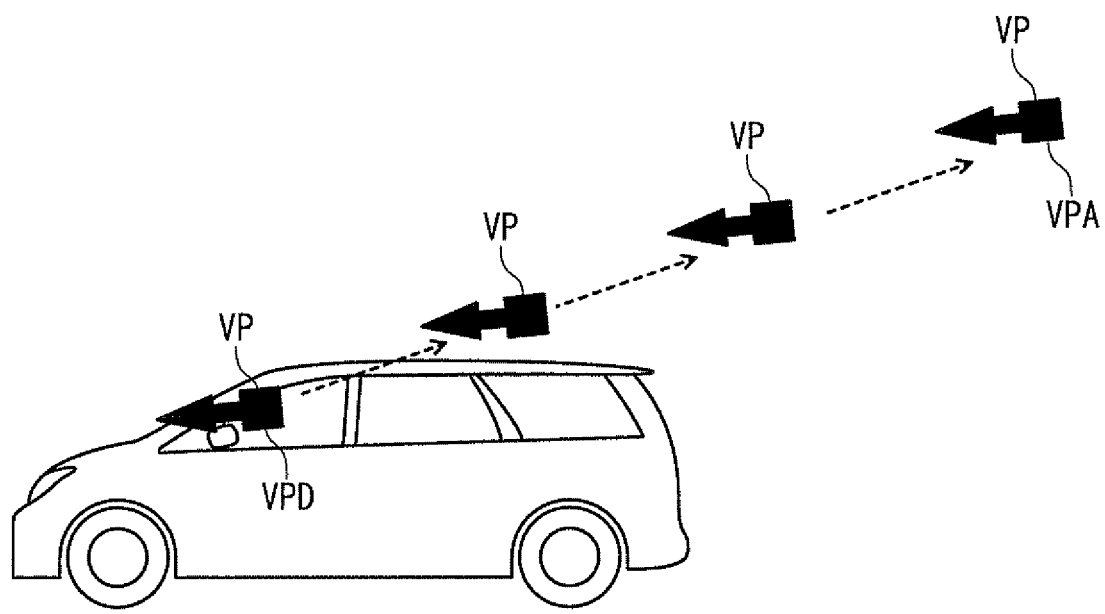
FIG. 14 is a view showing movement of a virtual viewpoint.

If the display mode has been converted into the single image mode M12, animation expression is implemented such that the virtual viewpoint VP of the synthetic image FP3 moves in the manner that a plurality of synthetic images FP3 are continuously displayed. FIG. 13 is a view showing an example of display in the case where animation expression is implemented in the single image mode 12. FIG. 14 is a view showing movement of the virtual viewpoint VP in that case.

As illustrated in FIG. 14, the viewpoint position of the virtual viewpoint VP is changed by the control section 1, such that the viewpoint position of the virtual viewpoint VP is straightly moved from a position VPD corresponding to the viewpoint of the driver to a position VPA at the rear of the vehicle 9. While the virtual viewpoint VP is sequentially changed, a plurality of synthetic images FP3 are sequentially generated by the synthetic image generating section 32. Parameters to generate the plurality of synthetic images FP3 are extracted by the control section 1 by Linear interpolation based on parameters for the position VPD prior to the change and parameters for the position VPA after the change. The plurality of generated synthetic images FP3 are output in turn to the navigation apparatus 20, and sequentially displayed on the display 21.

Accordingly, as illustrated in FIG. 13, animation expression is implemented on the display 21, such that the virtual viewpoint VP of the synthetic image FP3 moves from a position corresponding to the viewpoint of the driver to the rear position of the vehicle 9. On the synthetic image FP3, the image of the vehicle 9 does not appear (ST11) because an initial viewpoint is the viewpoint of the driver. However, an image of a top portion of the vehicle 9 gradually appears (ST12 and ST13). Finally, an image of the vehicle 9 looking down the vehicle 9 from the rear appears (ST14). The animation expression is implemented for about one second.

In the case where the position of the virtual viewpoint VP is changed, if the virtual viewpoint VP is momentarily converted, the driver cannot easily determine the position of the virtual viewpoint VP, from which the synthetic image is viewed. By implementing the animation expression as in the present embodiment, the driver can intuitively recognize the position of the virtual viewpoint VP, from which the synthetic image is viewed, compared to the case where the virtual viewpoint VP is momentarily converted.

When implementing the animation expression, a position corresponding to the viewpoint of the driver of the vehicle 9 is a reference position, such that the viewpoint position of the virtual viewpoint VP is moved from the reference position. Since the viewpoint position after the change of the virtual viewpoint VP is presented based on the viewpoint position of the driver, the viewpoint position after the change of the virtual viewpoint VP can be easily intuitively recognized. The reference position to start the animation expression may not be the position corresponding to the viewpoint of the driver, and may be a position that can be easily intuitively recognized by the driver. For example, the reference position may be a position directly above substantially a center of the vehicle 9 or a substantially central position of the left and the right of a front bumper.

The animation expression can be implemented under any circumstances, e.g., in the case where the virtual viewpoint VP is changed, as well as the display mode is changed. For example, in the aforementioned binary image mode M11, even in the case where the viewpoint position of the virtual viewpoint VP is changed in the left and right direction in response to operation of the direction instructing device 83, the animation expression is preferably implemented. In any case, it is preferable to generate a plurality of synthetic images, for which animation expression can be implemented through continuous display, while the position of the virtual viewpoint is sequentially moved. Parameters to generate the synthetic images may be extracted by Linear interpolation based on parameters for a position prior to the change and parameters for a position after the change. By using the animation expression, the driver can intuitively recognize the position of the virtual viewpoint VP after the change.

<4-3. Side Camera Mode>

Returning to FIG. 5, a display aspect in the side camera mode M13 will be described below. In the side camera mode, the display 12 displays only the side image FP4. The side image FP4 is not a synthetic image from the virtual viewpoint VP, but is a display image obtained in the manner that a captured image obtained from capturing in the side cameras 52 of the left side is adjusted by the image adjusting section 31 to be a display image.

For example, the position of the driver's seat in the vehicle 9 of the present embodiment is the right side. Accordingly, the outside region of the front fender 94 on the left side of the vehicle 9, which is opposite to the position of the driver's seat, may be easily blinded. Accordingly, in the side camera mode M13, the outside region of the front fender 94 of the left side is enlarged and presented. Accordingly, the state of an object existing in the blinded region can be easily recognized, compared to the other display modes.

Figure 15:
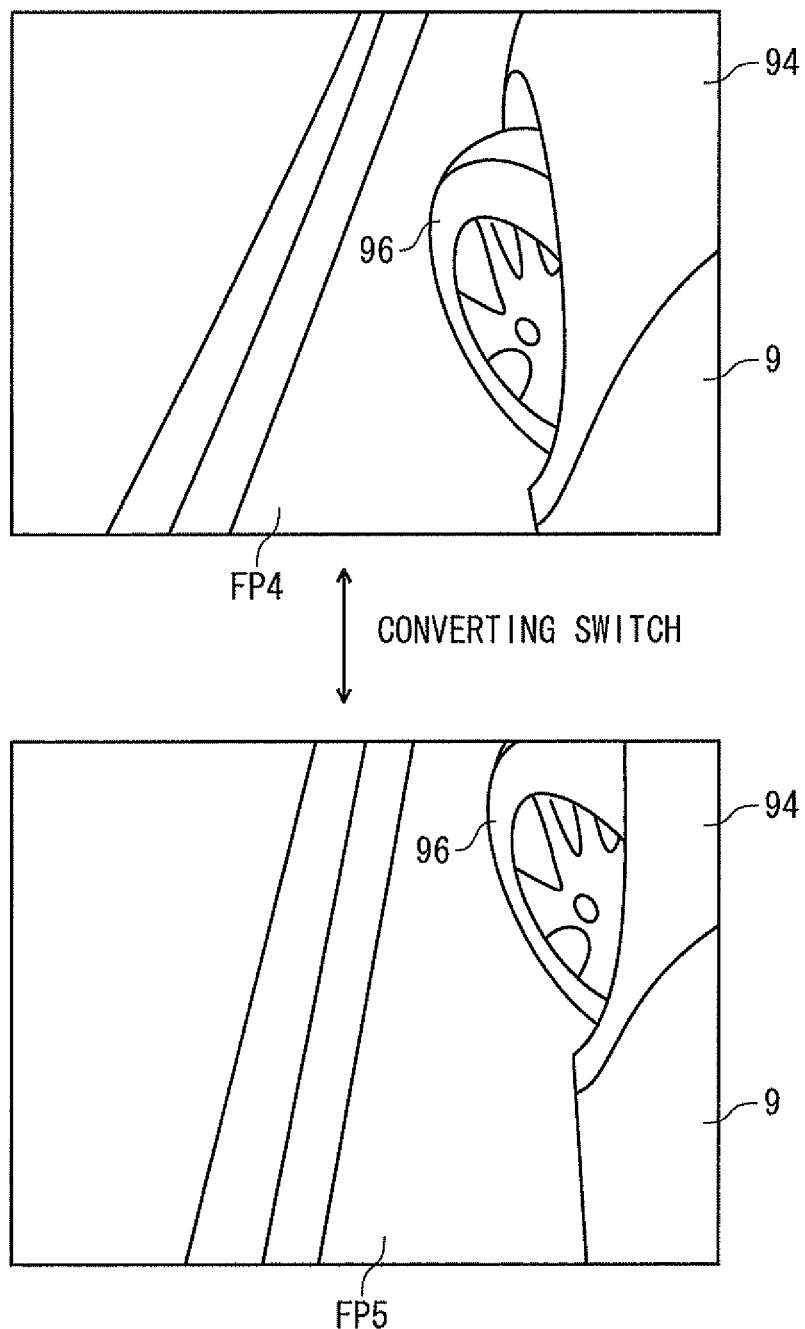
FIG. 15 is a view showing an example of screen display in a side camera mode.

As illustrated in FIG. 15, in the side camera mode M13, the converting switch 85 is pressed, so that the scope to be displayed on the display 21 can be converted. Specifically, conversion between the side image FP4, which enlarges and presents a region near a front wheel 96 of the left side of the vehicle 9, and the side image FP5, which enlarges and presents the rear region rather than the front wheel 96, is possible.

5. Back Mode

Figure 16:
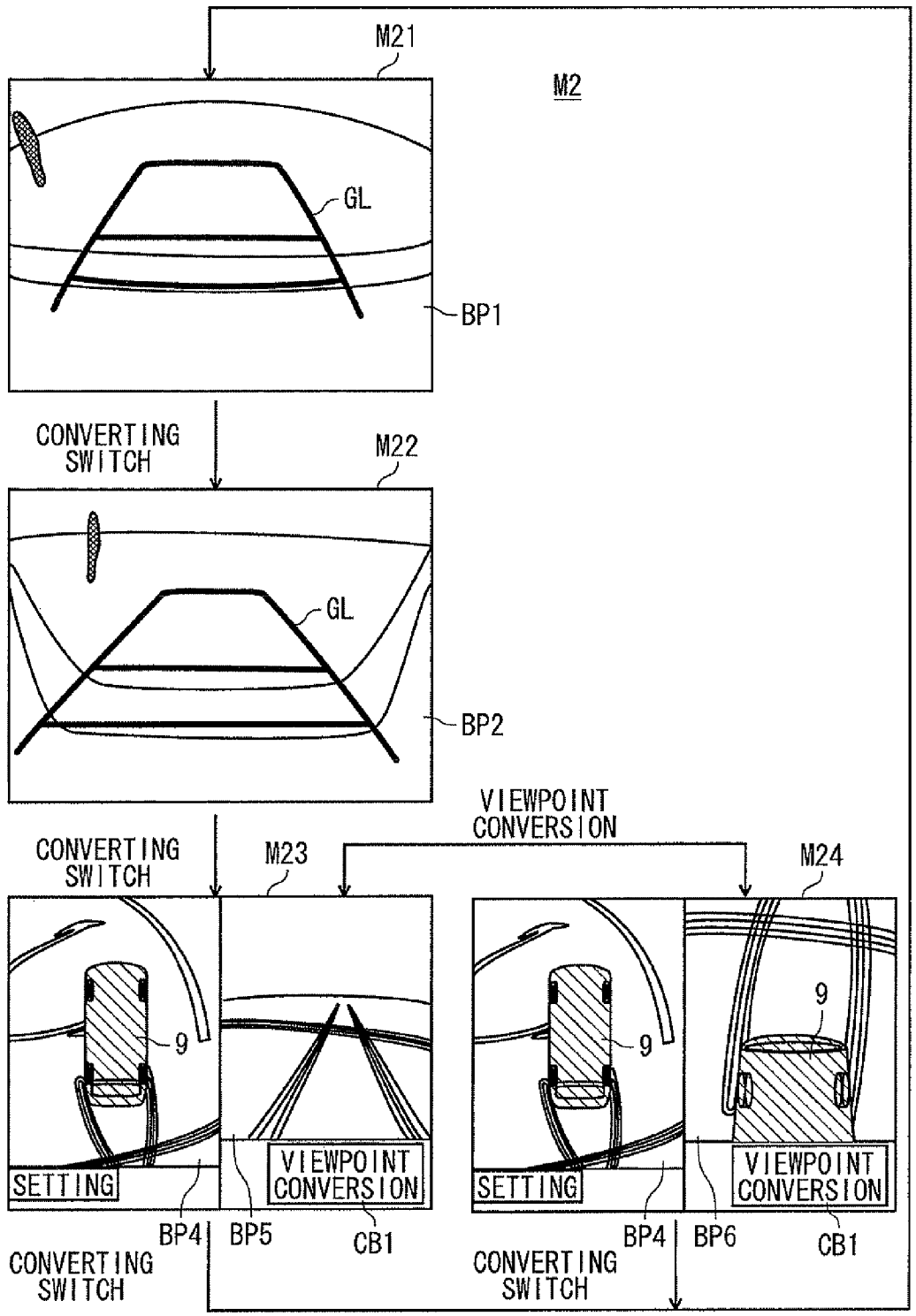
FIG. 16 is a view showing transition of a display mode in a back mode.

Hereinafter, a display aspect of the back mode M2, which is an operation mode when the position of the shift lever is "R (reversing)," will be described. FIG. 16 is a view showing transition of a display mode in the back mode M2. The back mode M2 includes four display modes, i.e., a standard mode M21, a wide mode M22, a synthetic standard mode M23, and a synthetic high angle mode M24. The modes are different in a display aspect. By performing predetermined operation, the driver can select certain one display mode and set the selected display mode as a current display mode (hereinafter, referred to as the "current mode").

Specifically, when the converting switch 85 is pressed, the current mode is set to the standard mode M21, the wide mode M22, and the synthetic standard mode M23 in this order. If the synthetic standard mode M23 is the current mode, when the converting switch 85 is pressed, the standard mode M21 is set as the current mode again. Instead of the converting switch 85, a command button on the screen may be pressed for conversion.

If the synthetic standard mode M23 is the current mode, when a viewpoint converting button CB 1 displayed as a command button on the screen of the display 21 is pressed, the synthetic high angle mode M24 is set as the current mode. Even if the synthetic high angle mode M24 is the current mode, when the viewpoint converting button CB1 displayed on the screen of the display 21 is pressed, the synthetic standard mode M23 is set as the current mode. If the synthetic high angle mode M24 is the current mode, when the converting switch 85 is pressed, the standard mode M21 is set as the current mode.

In the back mode M2, a display image corresponding to the current mode is generated by the image processing section 3 and displayed on the display 21. If the standard mode M21 and the wide mode M22 are the current mode, the display 21 displays a display image that only includes back images BP1 and BP2 obtained from capturing in the back camera 53. If the synthetic standard mode M23 is the current mode, the display 21 displays a display image that includes a synthetic image BP4 viewed from the virtual viewpoint VP and a back image BP5 obtained from capturing in the back camera 53 side by side. If the synthetic high angle mode M24 is the current mode, instead of the back image BP5 in the synthetic standard mode M23, a synthetic image BP6 viewed from the virtual viewpoint VP is displayed.

<5-1. Standard Mode>

Figure 17:
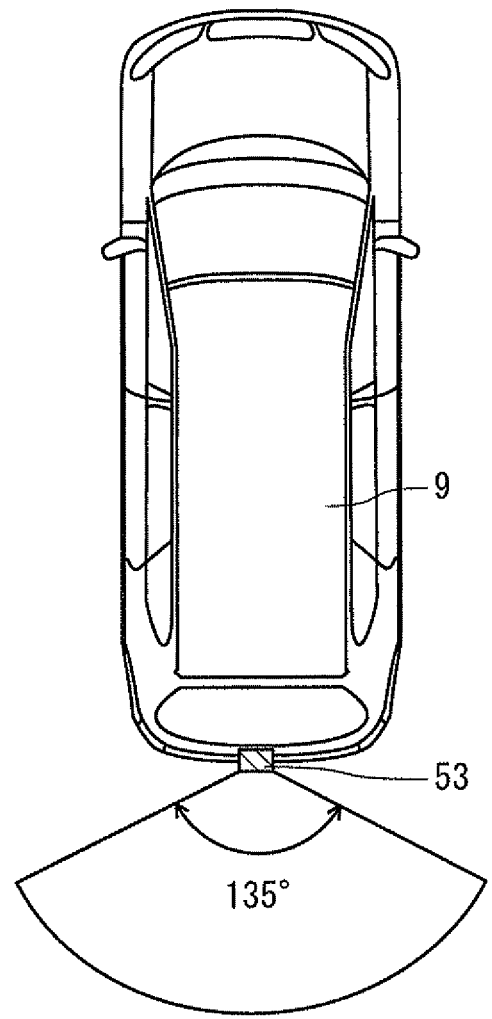
FIG. 17 is a view showing a horizontal angle of a visual field scope of a standard mode.

As illustrated in FIG. 16, in the standard mode M21, the display 21 only displays the back image BP1. The back image BP1 is not a synthetic image from the virtual viewpoint VP, but is a display image obtained in the manner that a captured image obtained from capturing in the back camera 53 is adjusted by the image adjusting section 31 to be a display image. As illustrated in FIG. 17, a horizontal angle of the visual field scope of the back image BP1 is 135°. In the standard mode M21, the rear region of the vehicle 9 is presented in a natural aspect.

In the back image BP1, a guide line GL presenting an expected path upon reversing of the vehicle 9 is displayed in an overlapping manner. The guide line GL is moved in accordance with a rotation direction and a rotation angle of the steering wheel input from the steering sensor 84. Accordingly, based on the guide line GL, the driver can reverse the vehicle 9.

<5-2. Wide Mode>

As illustrated in FIG. 16, even in the wide mode M22, the display 21 only displays the back image BP2. The back image BP2 is not a synthetic image from the virtual viewpoint VP, but is a display image obtained in the manner that a captured image obtained from capturing in the back camera 53 is adjusted in the image adjusting section 31 to be a display image. In the back image BP2 as well, the guide line GL indicating an expected path upon reversing of the vehicle 9 is displayed in an overlapping manner.

Figure 18:
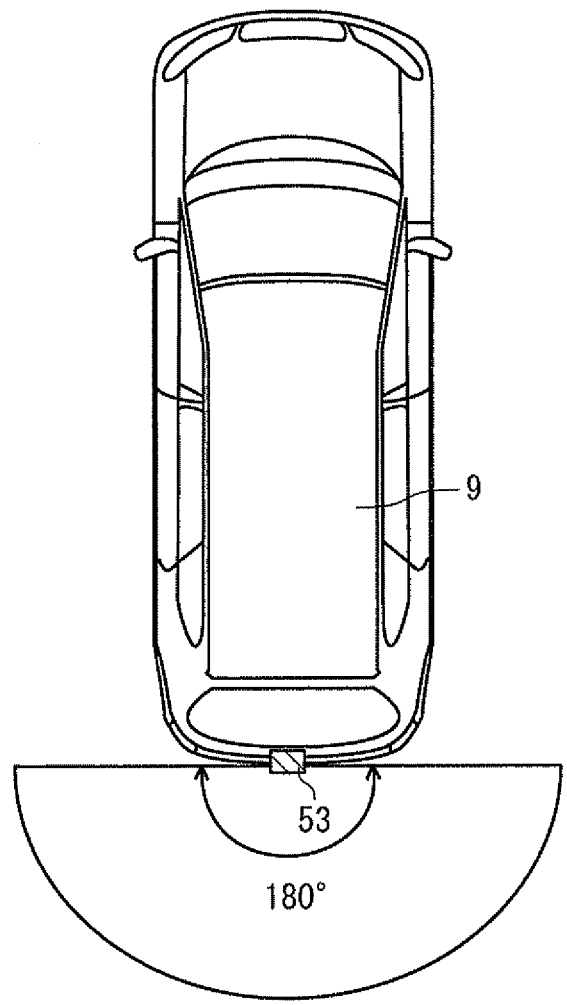
FIG. 18 is a view showing a horizontal angle of a visual field scope of a wide mode.

As illustrated in FIG. 18, a horizontal angle of the visual field scope of the back image BP2 is 180°. An object having a larger scope in the horizontal direction than the standard mode M21 can be monitored. Accordingly, in case of head-on parking, when the vehicle is reversed from the parking lot, the driver can monitor the left and right regions of the rear side that may be easily blinded, by using the wide mode M22 in the display aspect described above.

<5-3. Synthetic Standard Mode>

Figure 19:
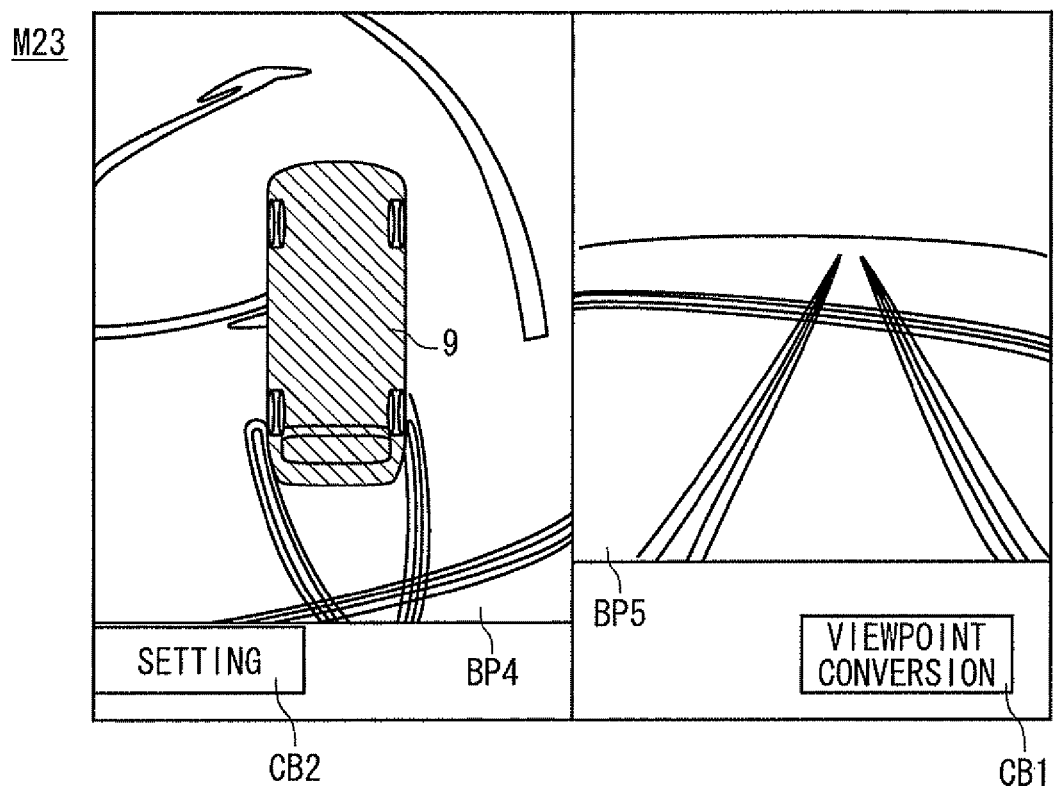
FIG. 19 is a view showing an example of a display image of a synthetic standard mode.

FIG. 19 is a view showing an example of a display image to be displayed on the display 21 in the synthetic mode M23. As illustrated in FIG. 19, on a display image in the synthetic standard mode M23, the synthetic image BP4 is disposed at the left side, and the back image BP5 is disposed at the right side. The synthetic image BP4 is a synthetic image viewed from the virtual viewpoint VP looking down the entire periphery of the vehicle 9. The back image BP5 is not a synthetic image from the virtual viewpoint VP, but is a display image obtained in the manner that a captured image obtained from capturing in the back camera 53 is adjusted in the image adjusting section 31 to be a display image. A horizontal angle of the visual field scope of the back image BP5 is 135°.

The driver sees the display image of the synthetic standard mode M23 in the display aspect described above, so that he/she can monitor the entire periphery of the vehicle 9 and the rear region of the vehicle 9 at the same time. Accordingly, the driver can safely reverse the vehicle 9 while recognizing an object around the entire circumference of the vehicle 9.

<5-4. Synthetic High Angle Mode>

Figure 20:
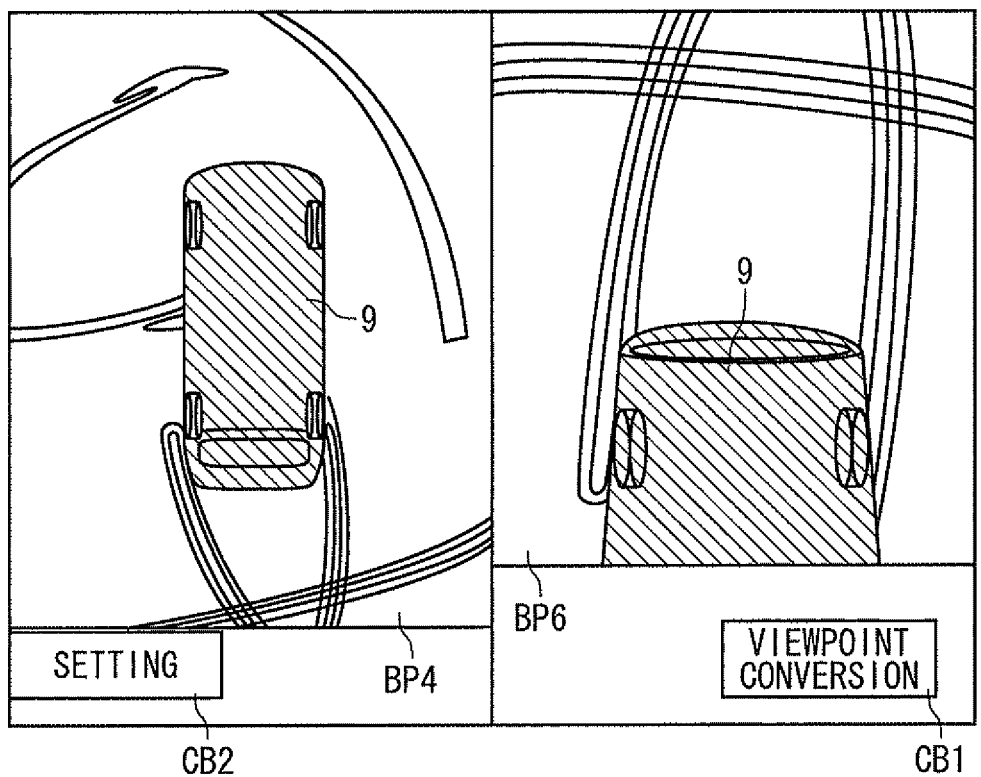
FIG. 20 is a view showing an example of a display image of a synthetic high angle mode.

FIG. 20 is a view showing an example of a display image to be displayed on the display 21 in the synthetic high angle mode M24. As illustrated in FIG. 20, the synthetic image BP4 viewed from the virtual viewpoint VP looking down the entire periphery of the vehicle 9 is disposed at the left side of the display image in the synthetic high angle mode M24, as in the synthetic standard mode M23. The synthetic image BP6 viewed from the virtual viewpoint VP substantially directly looking down the vicinity of the rear end of the vehicle 9 is disposed at the right side of the display image.

Figure 21:
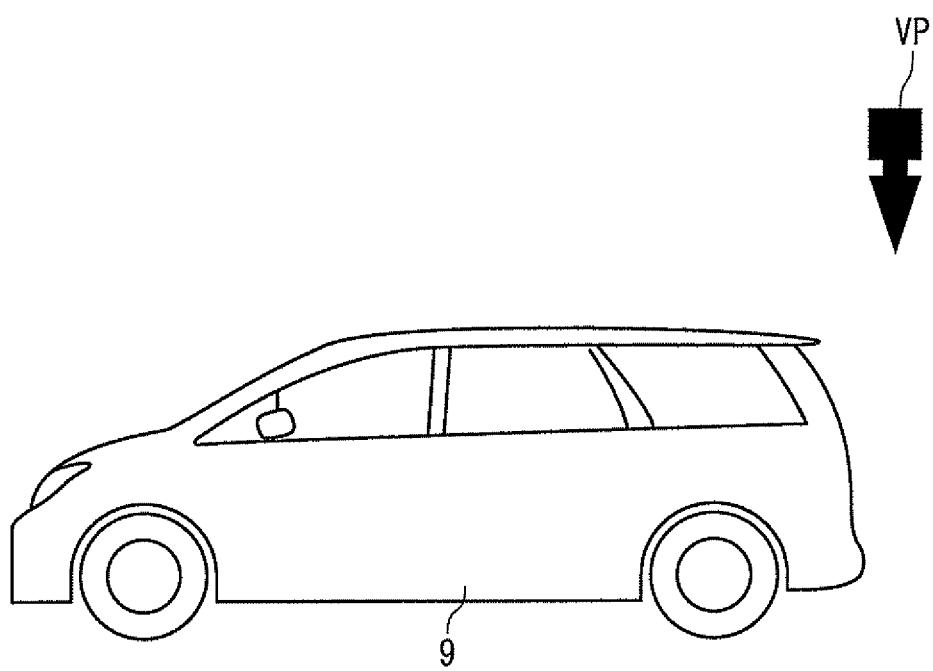
FIG. 21 is a view showing a viewpoint position of a virtual viewpoint of a synthetic high angle mode.

As illustrated in FIG. 21, the viewpoint position of the virtual viewpoint VP of the synthetic image BP6 is set to the position substantially directly above the rear end of the vehicle 9. The visual field direction is set to substantially a direct downward direction. Accordingly, on the synthetic image BP6, a region near the rear end of the vehicle 9 is enlarged and presented in the state that the region is looked down from the upward direction to substantially the direct downward direction. On the synthetic image BP6, a rear direction of the vehicle 9, which is the driving direction upon reversing of the vehicle 9, is an upper side direction of the image.

The driver sees the display image of the synthetic high angle mode M24 in the display aspect described above, so that he/she can easily monitor clearance between the vehicle 9 and an object around the vehicle 9, in particular, clearance with an object existing near the rear end of the vehicle 9. Meanwhile, it is difficult to monitor an object existing apart from the vehicle 9 in the rear region of the vehicle 9, which is the driving direction upon reversing of the vehicle 9. Accordingly, the synthetic high angle mode M24 is a display mode that can be effectively used under a special circumstance such as final adjustment of a parking position of the vehicle 9 in the case where the vehicle 9 is reversed upon parking.

<5-5. Angle Adjustment>

For the synthetic image BP4 disposed at the left side in the synthetic standard mode M23 (refer to FIG. 19) and the synthetic high angle mode M24 (refer to FIG. 20), the viewpoint position of the virtual viewpoint VP can be set to a position desired by the driver. In the synthetic standard mode M23 or the synthetic high angle mode 24, a setting button CB2 displayed as a command button on the screen is pressed, so that a setting screen to set the viewpoint position of the virtual viewpoint VP is displayed.

Figure 22:
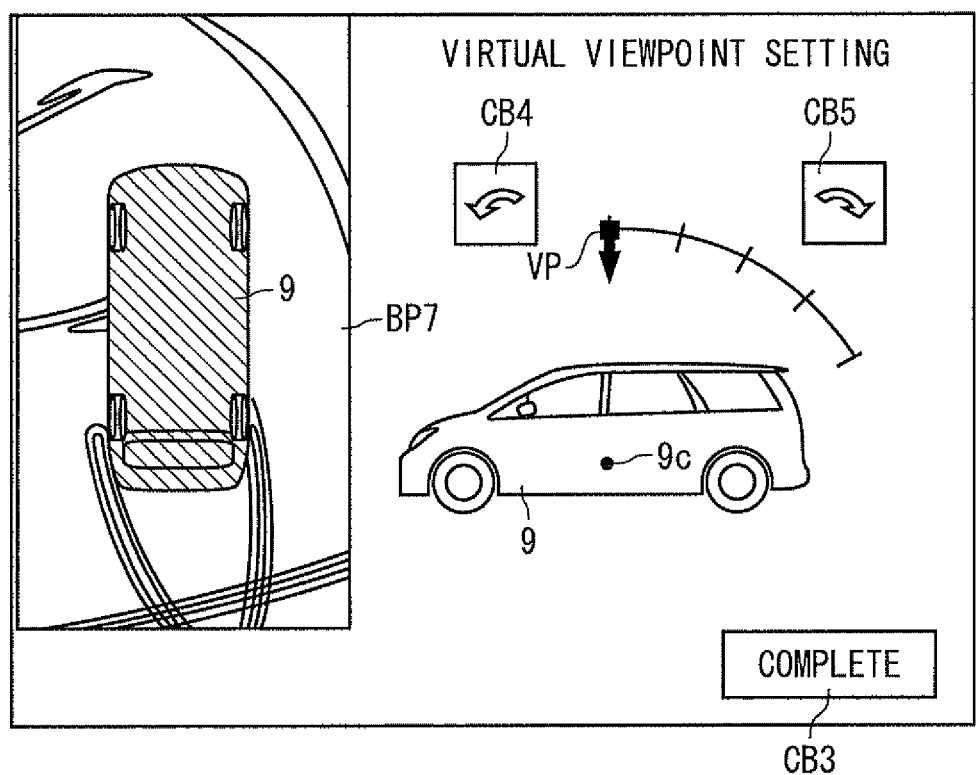
FIG. 22 is a view showing a setting screen of a virtual viewpoint.
Figure 23:
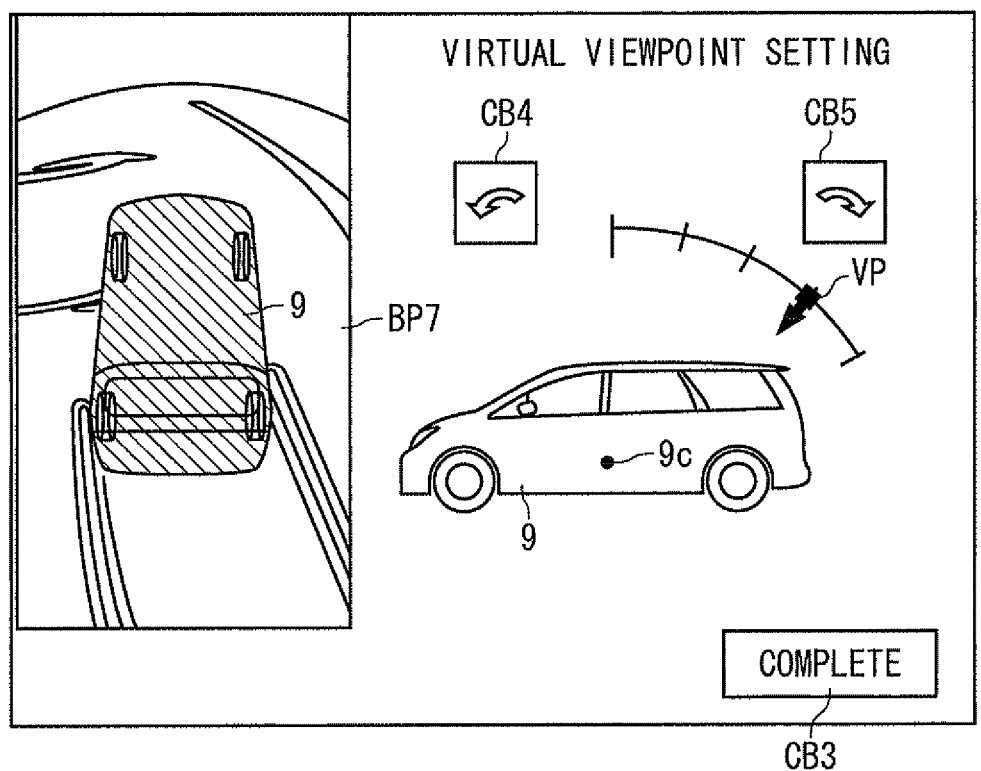
FIG. 23 is a view showing a setting screen of a virtual viewpoint.

FIGS. 22 and 23 are views showing the setting screen of the virtual viewpoint VP. The setting screen shows an indicator presenting the position of the virtual viewpoint VP to the vehicle 9, together with illustration of the side surface of the vehicle 9. The command buttons CB4 and CB5 on the screen are pressed so that the indicator can be moved. The position of the moved indicator to the illustration of the vehicle 9 is set as the viewpoint position of the virtual viewpoint VP. In this case, the visual field direction of the virtual viewpoint VP is set to be toward substantially a center 9c of the vehicle 9. FIG. 22 is a view showing an example of the case where the viewpoint position of the virtual viewpoint VP is set to a position directly above substantially a center of the vehicle 9. FIG. 23 is a view showing an example of the case where the viewpoint position of the virtual viewpoint VP is set to the rear position of the vehicle 9.

The left side of the setting screen displays the synthetic image BP7 in the case where the position of the indicator is the virtual viewpoint VP. Accordingly, by seeing the setting screen, it can be easily determined which synthetic image BP7 is obtained in the case where the virtual viewpoint VP is moved. Accordingly, the driver can move the virtual viewpoint VP to his/her desired position.

Figure 24:
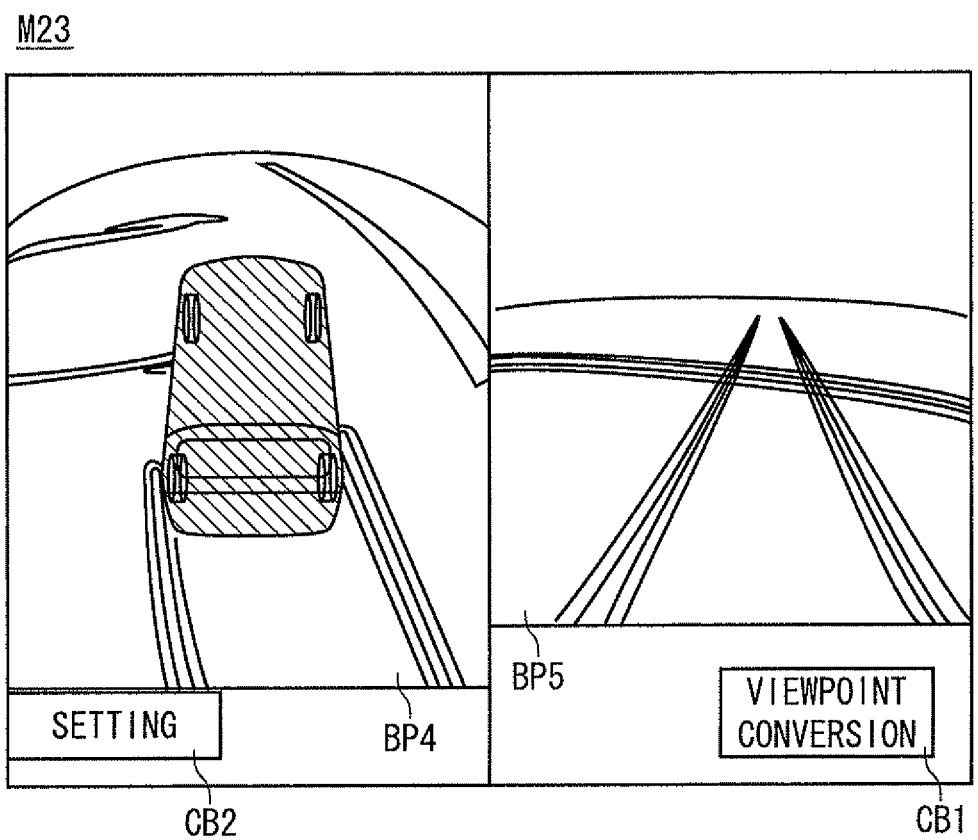
FIG. 24 is a view showing an example of a display image of a synthetic standard mode.

When the finish button CB displayed as a command button on the setting screen is pressed, the set contents are reflected on the display of the synthetic standard mode M23 and the synthetic high angle mode 24. For example, when the finish button BC3 on the setting screen as illustrated in FIG. 23 is pressed, the vehicle 9 is presented on the synthetic image BP4 at the left side of the display image in the state that the vehicle 9 is viewed from the rear side of the vehicle 9, as illustrated in FIG. 24. Since the viewpoint position of the virtual viewpoint VP can be set, the driver can recognize the positional relation between the vehicle 9 and an object around the vehicle 9 from a desired angle upon reversing of the vehicle 9.

<5-6. Current Mode Setting>

In the back mode M2, there are different four display modes to display images showing the peripheral regions of the vehicle 9 on the display 21 when the position of the shift lever is operated to be "R (reversing)." An instruction from the driver is received by the converting switch 85 or others. In accordance with the instruction, one display mode is selected. The selected display mode is set as the current mode. In general, the driver frequently uses one desired display mode among the four display modes in accordance with his/her favorites or an environment of a parking lot that he/she usually uses. If a display mode desired by the driver needs to be set as the current mode each time the vehicle 9 is reversed, the operation will become complicated.

Accordingly, in the image display system 100, the back mode M2 stores a display mode that has been recently set as the current mode. When the operation mode is the back mode M2 next time, an image is generated immediately after the operation mode is the back mode M2, based on the display mode that has been recently set as the current mode. Accordingly, the driver does not need to perform the complicated operation to select his/her desired display mode each time the vehicle 9 is reversed.

Figure 25:
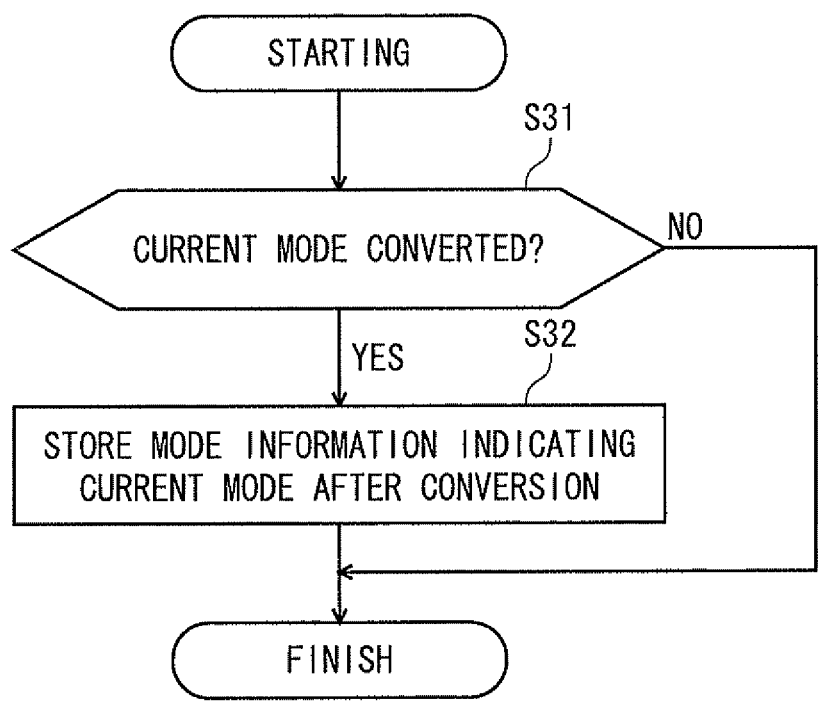
FIG. 25 is a view showing processing flow to store mode information.

FIG. 25 is a view showing flow of processing to store information indicating the current mode that has been most recently set. The processing is repeatedly carried out by the control section 1, in the case where the operation mode is the back mode M2.

First, it is determined whether or not the current mode has been converted into another display mode (S31). If the current mode has been converted into another display mode, mode information indicating the current mode after the conversion is stored in the non-volatile memory 11 (S32). Since the processing is carried out each time the current mode is converted, mode information indicating the display mode that has been recently set as the current mode is stored in the non-volatile memory 11. The mode information is stored in the non-volatile memory 11 when the operation mode is an operation mode other than the back mode M2 (when the transmission of the vehicle 9 is at a position other than "R (reversing)") or when the power of the image display system 100 is off.

Figure 26:
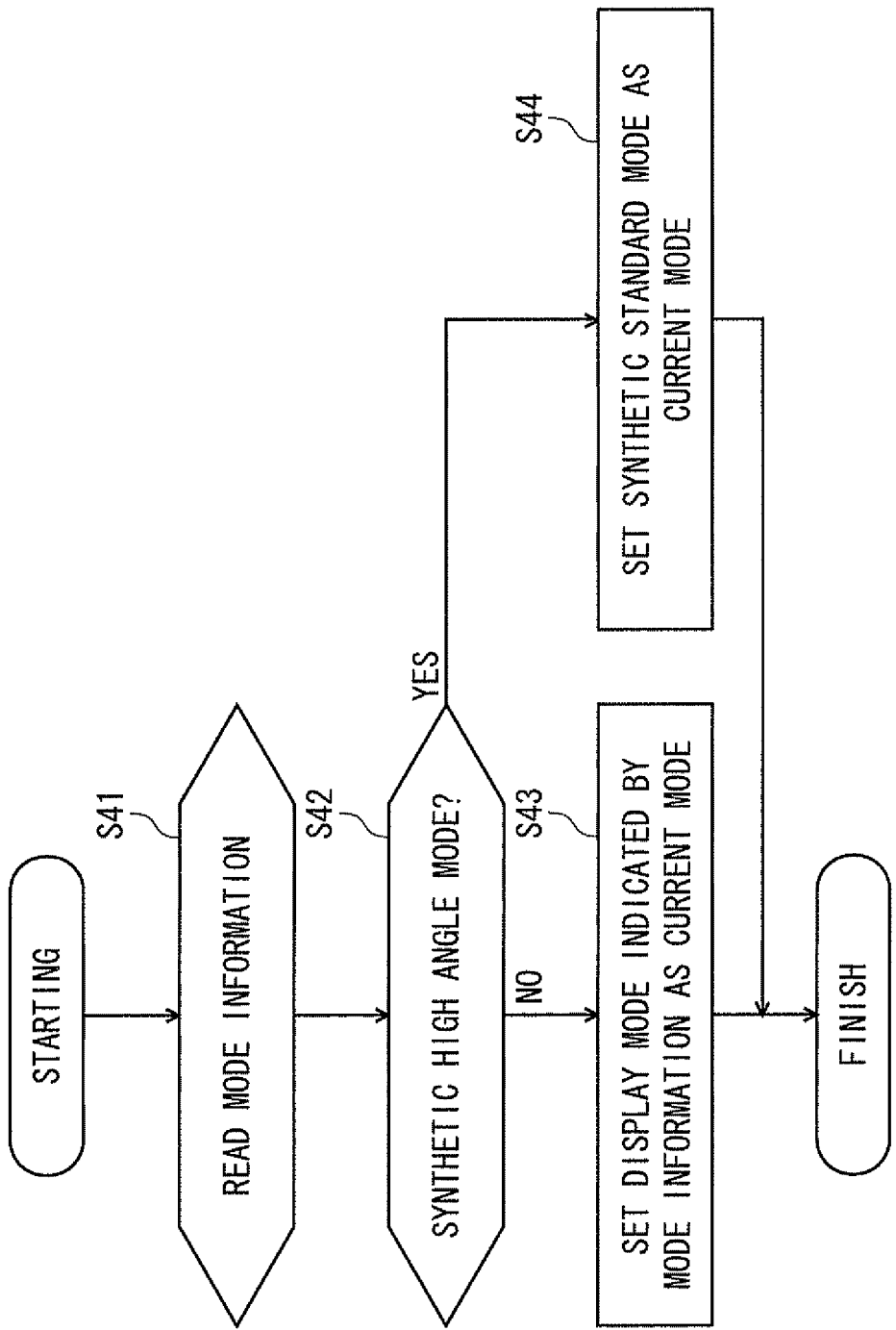
FIG. 26 is a view showing processing flow of time to start a back mode.

FIG. 26 is a view showing processing flow of time to start the back mode M2. The processing is carried out by the control section 1 when the transmission of the vehicle 9 is operated to be positioned at "R (reversing)," and when the operation mode is the back mode M2.

First, the mode information stored in the non-volatile memory 11 is read (S41). It is determined what is the display mode indicated by the read mode information (S42).

If the display mode indicated by the mode information is a display mode other than the synthetic high angle mode M24 (No in S42), the display mode indicated by the mode information is set as the current mode (S43). The synthetic image generating section 32 or the display image generating section 33 generates an image of the display mode that has been set as the current mode. If the display mode indicated by the mode information is the synthetic high angle mode M24 (Yes in S42), the synthetic standard mode M23 is set as the current mode (544). The synthetic image generating mode 32 or the display image generating section 33 generates an image of the synthetic standard mode M23.

The display mode that has been recently set as the current mode is in principle set as the current mode immediately after the operation mode becomes the back mode M2. However, if the display mode that has been recently set as the current mode is the synthetic high angle mode M24, the synthetic standard mode M23, and not the synthetic high angle mode M24, is set as the current mode immediately after the operation mode becomes the back mode M2. Since the synthetic high angle mode M24 is usually used when the parking position of the vehicle 9 is finally adjusted, the synthetic high angle mode M24 is rarely used at the time of starting reversing of the vehicle 9. Accordingly, if the display mode that has been recently set as the current mode is the synthetic high angle mode M24, on exception, another display mode is set as the current mode immediately after the operation mode becomes the back mode M2, so that the complicated operation to change the current mode from the synthetic high angle mode M24 to another display mode is unnecessary.

Meanwhile, the processing to exceptionally treat the synthetic high angle mode M24 may be carried out by a processing different from that illustrated in FIGS. 25 and 26.

Figure 27:
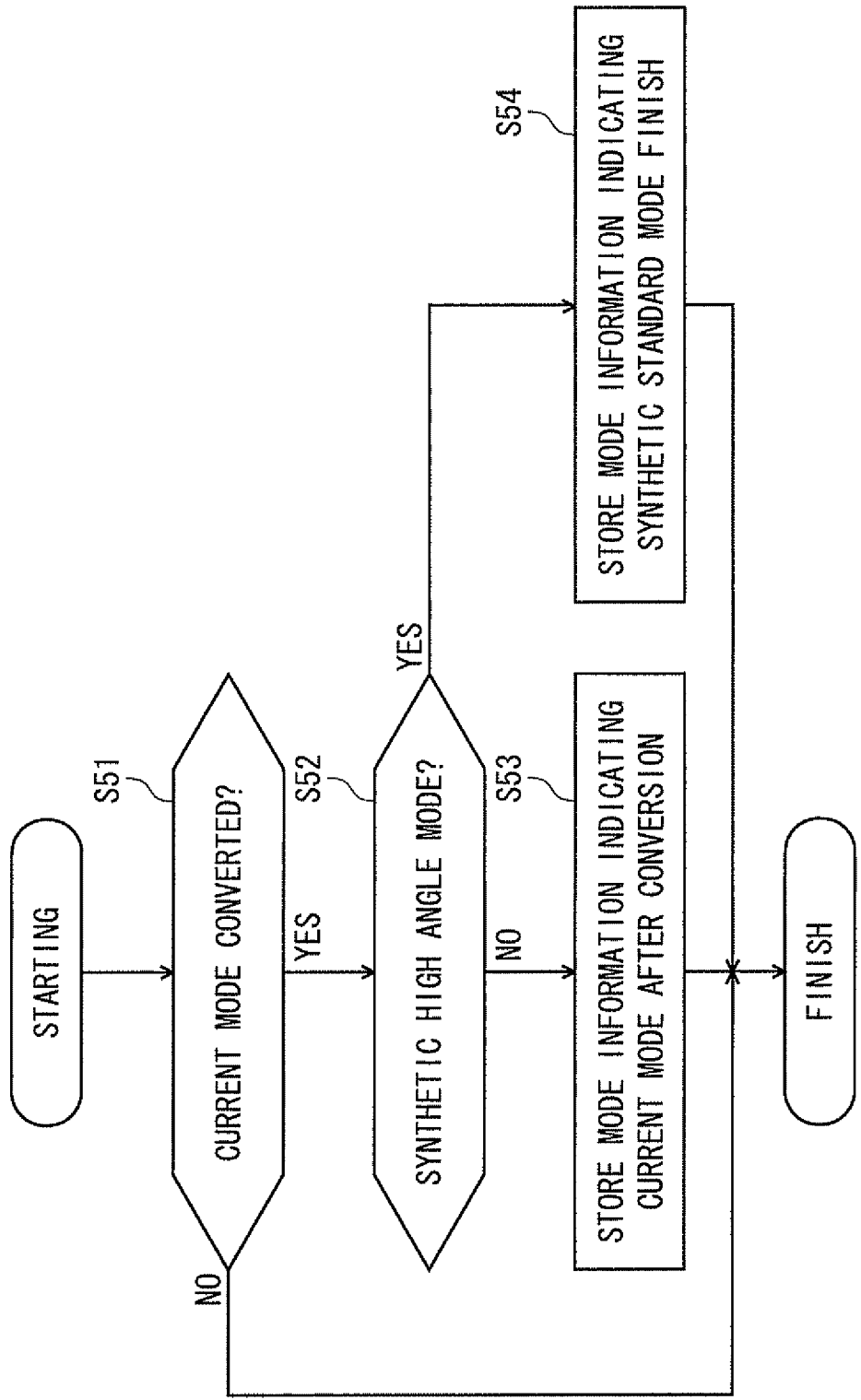
FIG. 27 is a view showing processing flow to store mode information.

FIG. 27 is a view showing another example of flow of processing to store information indicating the recent current mode. The processing also is repeatedly carried out by the control section 1 when the operation mode is the back mode M2.

First, it is determined whether or not the current mode has been converted into another display mode (S51). If the current mode has been converted into another display mode, it is determined what is the current mode after the conversion (S52).

If the current mode after the conversion is a display mode other than the synthetic high angle mode M24 (No in S52), mode information indicating the current mode after the conversion is stored in the non-volatile memory 11 (S53). If the current mode after the conversion is the synthetic high angle mode M24 (Yes S52), mode information indicating the synthetic standard mode M23 is stored in the non-volatile memory 11 (S54).

Accordingly, mode information indicating the display mode that has been recently set as the current mode is in principle stored in the non-volatile memory 11. However, if the display mode that has been recently set as the current mode is the synthetic high angle mode M24, on exception, mode information indicating the synthetic standard mode M23 is stored.

Figure 28:
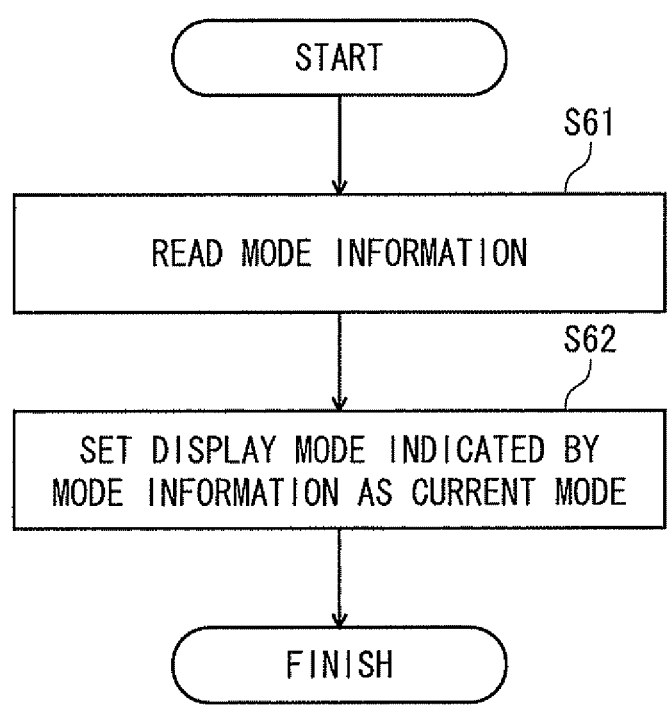
FIG. 28 is a view showing processing flow of time to start a back mode.

FIG. 28 is a view showing processing flow of time to start the back mode M2 in carrying out the processing of FIG. 27. The processing also is carried out by the control section 1 when the transmission of the vehicle 9 is operated to be positioned at "R (reversing)" such that the operation mode becomes the back mode M2.

First, mode information stored in the non-volatile memory 11 is read (S61). The display mode indicated by the read mode information is set as the current mode (S62). In the processing as well, if the display mode that has been recently set as the current mode is the synthetic high angle mode M24, on exception, another display mode may be set as the current mode immediately after the operation mode becomes the back mode M2. As a result, the complicated operation to change the current mode from the synthetic high angle mode M24 to another display mode is unnecessary.

6. Modified Embodiment

An embodiment of the present invention has been described. However, the present invention is not limited to the embodiment that has been described. Various modifications to the present invention may be made. Hereinafter, modified embodiments of the present invention will be described. Of course, the modifications set forth below may be properly combined.

In the embodiment that has been described, the image generating apparatus 10 and the navigation apparatus 20 are different. However, the navigation apparatus 20 and the image generating apparatus 10 may be disposed in the same housing to construct an integrated apparatus.

In the embodiment that has been described, the display apparatus that displays a display image generated in the image generating apparatus 10 is the navigation apparatus 20. However, the display apparatus may be a general display apparatus that has not a special function such as a navigation function.

In the embodiment that has been described, part of the function that is realized by the control section 1 of the image generating apparatus 10 may be realized by the control section 23 of the navigation apparatus 20.

Signals from the shift sensor 81, the vehicle speed sensor 82, the direction instructing device 83, the steering sensor 84, and the converting switch 85 are input into the image generating apparatus 10. However, part or all of the signals may be input into the navigation apparatus 20. In that case, part or all of the signals may be input into the control section 1 of the image generating apparatus 10 through the communication section 42.

In the embodiment that has been described, an instruction of a direction desired by the driver is input from the direction instructing device 83. However, the instruction may be input by other means. For example, movement of a viewpoint of the driver is detected from an image obtained from capturing the driver's eyes. From the detection results, a direction instruction intended by the driver may be input.

In the embodiment that has been described, the specific display mode that is exceptionally treated in the back mode M2 is the synthetic high angle mode M24. However, another display mode, and not the synthetic high angle mode M24, may be set as the specific display mode. For example, a display mode that only displays an image from a virtual viewpoint substantially directly looking down the vicinity of the rear end of the vehicle 9 may be the specific display mode. Preferably, a display mode in an aspect used under a special condition such as final adjustment of a parking position is the specific display mode.

In the embodiment that has been described, various functions are accomplished by software through calculation processing of the CPU in accordance with programs. However, part of the functions may be accomplished by an electrical hardware circuit. Reversely, part of the function that is accomplished by a hardware circuit may be accomplished by software.

The present invention is based on Japanese patent applications filed on May 29, 2009 (Japanese Patent Application No. 2009-130101), the disclosures of which are herein incorporated by reference.

DESCRIPTION OF REFERENCE NUMERALS 1 control section
3 image processing section
5 capturing section
10 image generating apparatus
11 non-volatile memory
21 display
32 synthetic image generating section
42 communication section
100 image display system

The invention claimed is:

1. An image generating apparatus that generates an image to be displayed on a display apparatus mounted on a vehicle, the image generating apparatus comprising:
   a mode receiving section that receives an instruction from a user, the instruction for selecting a display mode from among a plurality of display modes, and for setting the selected display mode as a most-recently-set mode, the plurality of display modes being different from each other and causing the display apparatus to display an image showing the periphery of the vehicle while a transmission of the vehicle is shifted in a reverse gear;
   a nonvolatility storing section that stores mode information indicating the most-recently-set mode which has been most recently set;
   a generating section that generates the image of one of the display modes in accordance with the mode information stored in the storing section; and
   an output section that outputs the generated image to the display apparatus,
   wherein the generating section generates an image of the most-recently-set mode when the mode information indicates a display mode other than a first specific display mode in the display modes as the most-recently-set mode, and
   wherein the generating section generates an image of a second specific display mode different from the first specific display mode when the mode information indicates the first specific display mode as the most-recently-set mode.

2. The image generating apparatus as set forth in claim 1, further comprising a controller including the storing section therein, wherein the controller reads the mode information stored in the storing section and controls the generating section to generate the image of the most-recently-set mode when the mode information indicates the display mode other than the first specific display mode as the most-recently-set mode, and wherein the controller reads the mode information stored in the storing section and controls the generating section to generate the image of the second specific display mode when the mode information indicates the first specific display mode as the most-recently-set mode.

3. The image generating apparatus as set forth in claim 1, wherein the generating section starts generating the image of one of the display modes when the transmission of the vehicle is being shifted into the reverse gear.

4. The image generating apparatus as set forth in claim 1, wherein the first specific display mode is used for final adjustment of a parking position of the vehicle.

5. The image generating apparatus as set forth in claim 1, wherein the first specific display mode is a display mode to make the display apparatus display an image being viewed from a virtual viewpoint substantially directly looking down a rear end of the vehicle.

6. An image display system to be mounted on a vehicle, the image displaying system comprising:

the image generating apparatus as set forth in claim 1; and a display apparatus that displays an image generated by the image generating apparatus.

7. An image generating apparatus that generates an image to be displayed on a display apparatus mounted on a vehicle, the image generating apparatus comprising:

a mode receiving section that receives an instruction from a user, the instruction for selecting a display mode from among a plurality of display modes, and for setting the selected display mode as a most-recently-set mode, the plurality of display modes being different from each other and causing the display apparatus to display an image showing the periphery of the vehicle while a transmission of the vehicle is shifted in a reverse gear;

a nonvolatility storing section that stores mode information;

a generating section that generates the image of one of the display modes in accordance with the mode information stored in the storing section; and an output section that outputs the generated image to the display apparatus, wherein the storing section stores the mode information indicating the most-recently-set mode when the most-recently-set mode which has been most recently set is a display mode other than a first specific display mode in the display modes, and wherein the storing section stores the mode information indicating a second specific display mode different from the first specific display mode when the most-recently-set mode which has been most recently set is the first specific display mode.

8. The image generating apparatus as set forth in claim 7, further comprising a controller including the storing section therein, wherein the controller controls the storing section to store the mode information indicating the most-recently-set mode when the most-recently-set mode which has been most recently set is the display mode other than the first specific display mode, wherein the controller controls the storing section to store the mode information indicating the second specific display mode when the most-recently-set mode which has been most recently set is the first specific display mode.

9. The image generating apparatus as set forth in claim 7, wherein the generating section starts generating the image of one of the display modes when the transmission of the vehicle is being shifted into the reverse gear.

10. The image generating apparatus as set forth in claim 7, wherein the first specific display mode is used for final adjustment of a parking position of the vehicle.

11. The image generating apparatus as set forth in claim 7, wherein the first specific display mode is a display mode to make the display apparatus display an image being viewed from a virtual viewpoint substantially directly looking down a rear end of the vehicle.

12. An image display system to be mounted on a vehicle, the image displaying system comprising:

the image generating apparatus as set forth in claim 7; and a display apparatus that displays an image generated by the image generating apparatus.

\* \* \* \* \*